United States Patent
Mori et al.

(10) Patent No.: US 7,425,892 B2
(45) Date of Patent: Sep. 16, 2008

(54) TIRE INFLATION PRESSURE SENSING APPARATUS WITH FUNCTION OF DETECTING TIRE LOCATION

(75) Inventors: Masashi Mori, Oobu (JP); Nobuya Watabe, Nagoya (JP); Ryouzou Okumura, Kariya (JP)

(73) Assignee: DENSO CORPORATION, Kariya (JP)

( * ) Notice: Subject to any disclaimer, the term of this patent is extended or adjusted under 35 U.S.C. 154(b) by 601 days.

(21) Appl. No.: 11/127,306

(22) Filed: May 12, 2005

(65) Prior Publication Data

US 2005/0253696 A1 Nov. 17, 2005

(30) Foreign Application Priority Data

May 13, 2004 (JP) ............................. 2004-143400
Aug. 30, 2004 (JP) ............................. 2004-250504

(51) Int. Cl.
*B60C 23/00* (2006.01)
*B60C 23/02* (2006.01)

(52) U.S. Cl. ...................... 340/442; 340/445; 340/447; 73/146; 73/146.2; 116/34 R

(58) Field of Classification Search ............. 340/425.5, 340/438, 442, 445, 447; 73/146, 146.2; 116/34 R
See application file for complete search history.

(56) References Cited

U.S. PATENT DOCUMENTS

| | | | |
|---|---|---|---|
| 5,602,524 A | 2/1997 | Mock et al. | |
| 6,259,361 B1 * | 7/2001 | Robillard et al. | 340/447 |
| 6,278,363 B1 * | 8/2001 | Bezek et al. | 340/442 |
| 7,271,711 B2 * | 9/2007 | Daiss et al. | 340/447 |
| 2003/0107481 A1 | 6/2003 | Sawafuji | |
| 2003/0197603 A1 | 10/2003 | Stewart et al. | |
| 2004/0069058 A1 | 4/2004 | Masudaya | |
| 2004/0164854 A1 * | 8/2004 | Nantz et al. | 340/443 |

\* cited by examiner

*Primary Examiner*—George A Bugg
*Assistant Examiner*—Travis R Hunnings
(74) *Attorney, Agent, or Firm*—Posz Law Group, PLC

(57) ABSTRACT

A tire inflation pressure sensing apparatus according to the invention includes a plurality of transmitters, each of which is provided on one of a plurality of wheels of a vehicle, and a receiver provided on a body of the vehicle. Each transmitter includes a pressure sensor working to generate a pressure signal representative of an inflation pressure of a tire on a corresponding one of the wheels and a noise receiver working to receive a noise generated by a noise source in the vehicle. Each transmitter is configured to transmit the pressure signal and the received noise to the receiver. The receiver is configured to determine the inflation pressures of tires based on the pressure signals and make a determination for each of the transmitters as to whether the transmitter is provided on a front-wheel or a rear-wheel of the vehicle based on a level of the corresponding received noise.

64 Claims, 15 Drawing Sheets

*VSS: VEHICLE SPEED SENSOR
*GPS: GEAR POSITION SENSOR

*G: GRAVITATIONAL ACCELERATION

*VSS: VEHICLE SPEED SENSOR
*GPS: GEAR POSITION SENSOR

FIG. 16

| ID | ACCUMULATED NUMBER OF TIMES | DETERMINATION RESULT |
|---|---|---|
| A | 30 | VEHICLE 1 |
| B | 29 | VEHICLE 1 |
| C | 30 | VEHICLE 1 |
| D | 28 | VEHICLE 1 |
| E | 30 | VEHICLE 1 |
| F | 10 | VEHICLE 100 |
| G | 2 | VEHICLE 100 |
| H | 0 | VEHICLE 100 |

TIRE INFLATION PRESSURE SENSING APPARATUS WITH FUNCTION OF DETECTING TIRE LOCATION

CROSS-REFERENCE TO RELATED APPLICATION

This application claims priority from Japanese Patent Applications No. 2004-250504, filed on Aug. 30, 2004, and No. 2004-143400, filed on May 13, 2004, the contents of which are hereby incorporated by reference into this application.

BACKGROUND OF THE INVENTION

1 Technical Field of the Invention

The present invention relates generally to tire inflation pressure sensing apparatuses or sensors. More particularly, the invention relates to a direct-type tire inflation pressure sensing apparatus which is configured to sense inflation pressures of tires of a vehicle and has a function of detecting the location of each of the tires in the vehicle.

2 Description of the Related Art

Conventional direct-type tire inflation pressure sensing apparatuses generally include a plurality of transmitters and a receiver.

Each of the transmitters is directly installed to one of a plurality of wheels of a vehicle and includes a pressure sensor working to sense an inflation pressure of a tire mounted on the wheel. Each of the transmitters is configured to send out a pressure signal representative of the inflation pressure of the tire sensed by the pressure sensor.

The receiver is installed to the body of the vehicle and includes at least one antenna. The receiver is configured to receive the pressure signals sent out from the transmitters through the at least one antenna and determine inflation pressures of tires of the vehicle based on the respective received pressure signals.

In the above arrangement, in addition to the pressure signals sent out from the transmitters, the receiver may also receive signals that are sent out from signal sources located outside the vehicle. However, it is impossible for the receiver to determine whether a signal received thereby has been sent out from one of the transmitters or from a signal source located outside the vehicle.

Moreover, it is impossible for the receiver to detect the location of each of the transmitters (i.e., each of the tires) in the vehicle. In other words, the receiver cannot determine from which one of the transmitters a pressure signal received thereby has been sent out.

To solve the above problems, Japanese Patent No. 3212311, an English equivalent of which is U.S. Pat. No. 5,602,524, proposes an approach.

According to the approach, each of the transmitters is configured to send out an ID signal representative of the identity thereof together with the pressure signal. On the other hand, the receiver is configured to have reference ID signals registered therein, each of which coincides with one of the ID signals sent out from the transmitters.

The receiver works to compare an ID signal received thereby with the reference ID signals registered therein and identify the transmitter from which the ID signal has been sent out when the ID signal coincides with one of the reference ID signals.

Consequently, the receiver can detect the location of the tire corresponding to the identified transmitter in the vehicle.

More specifically, the receiver can determine whether the tire is mounted on a front-right, a front-left, a rear-right, or a rear-left wheel of the vehicle. Further, the receiver can determine the inflation pressure of the tire based on the pressure signal accompanying the ID signal.

However, according to the approach, each of the transmitters necessitates an ID signal specific thereto, and it is required to previously register reference ID signals in the receiver.

Moreover, as tire replacement or rotations are performed, it is required to newly register reference ID signals in the receiver. However, the registration of reference ID signals in the receiver is a time-consuming task and necessitates some additional devices.

SUMMARY OF THE INVENTION

The present invention has been made in view of the above-mentioned problems.

It is, therefore, a primary object of the present invention to provide a tire inflation pressure sensing apparatus which is configured to sense inflation pressures of tires of a vehicle and can reliably detect the location of each of the tires in the vehicle without registration of reference ID signals in a receiver thereof.

According to the present invention, a tire inflation pressure sensing apparatus is provided which includes a plurality of pressure sensors, a plurality of transmitters, and a first receiver.

Each of the pressure sensors is provided on one of a plurality of wheels of a vehicle. Each of the pressure sensors works to sense an inflation pressure of a tire mounted on a corresponding one of the wheels and output a pressure signal representative of the sensed inflation pressure of the tire.

Each of transmitters is provided on one of the wheels of the vehicle. Each of the transmitters is configured to receive the pressure signal outputted from a corresponding one of the pressure sensors and send out a pressure transmitting signal corresponding to the received pressure signal.

The first receiver is provided on a body of the vehicle. The first receiver is configured to receive the pressure transmitting signals sent out from the transmitters and determine the inflation pressures of the tires based on the respective received pressure transmitting signals.

According to the first aspect of the invention, the tire inflation pressure sensing apparatus further includes a plurality of second receivers each of which is provided on one of the wheels of the vehicle.

Each of the second receivers works to receive a signal generated by a signal source that is located in the vehicle and provide the received signal to a corresponding one of the transmitters.

Each of the transmitters is configured to make a determination for a corresponding one of the wheels of the vehicle as to whether the wheel is a front-wheel or a rear-wheel of the vehicle based on a level of the signal provided by a corresponding one of the second receivers.

Otherwise, each of the transmitters is configured to relay the signal provided by a corresponding one of the second receivers to the first receiver; the first receiver is configured to make a determination for each of the wheels of the vehicle as to whether the wheel is a front-wheel or a rear-wheel of the vehicle based on a level of the signal relayed from a corresponding one of the transmitters.

In the above tire inflation pressure sensing apparatus, when the wheels of the vehicle are at different distances from the signal source, each of the transmitters may be configured to make a further determination for the corresponding one of the wheels as to whether the wheel is a right-wheel or a left-wheel of the vehicle based on the level of the signal provided by the corresponding one of the second receivers.

Otherwise, the first receiver may be configured to make a further determination for each of the wheels as to whether the wheel is a right-wheel or a left-wheel of the vehicle based on the level of the signal provided by the corresponding one of the second receivers.

In the above tire inflation pressure sensing apparatus, the signal source may be a noise source that generates a noise as the signal.

Further, the noise generated by the noise source may have a frequency within one of a voice band, a LF band, a HF band, a VHF band, and a UHF band.

In the above tire inflation pressure sensing apparatus, the signal source may be a specially designed one to generate the signal only for the tire inflation pressure sensing apparatus.

Otherwise, the signal source may be designed to generate the signal for performing a predefined operation of the vehicle, and the signal is utilizable for the tire inflation pressure sensing apparatus.

According to the second aspect of the invention, the tire inflation pressure sensing apparatus further includes a plurality of acceleration sensors each of which is provided on one of the wheels of the vehicle.

Each of the acceleration sensors works to generate an acceleration signal as a function of a circumferential acceleration of a corresponding one of the wheels and output the acceleration signal to a corresponding one of the transmitters.

Each of the transmitters is configured to make a determination for a corresponding one of the wheels as to whether the wheel is a right-wheel or a left-wheel of the vehicle based on the acceleration signal outputted from a corresponding one of the acceleration sensors.

Otherwise, each of the transmitters is configured to relay the acceleration signal outputted from a corresponding one of the acceleration sensors to the first receiver; the first receiver is configured to make a determination for each of the wheels as to whether the wheel is a right-wheel or a left-wheel of the vehicle based on the acceleration signal relayed from a corresponding one of the transmitters.

According to the third aspect of the invention, the tire inflation pressure sensing apparatus further includes a plurality of first acceleration sensors and a plurality of second acceleration sensors.

Each of the first acceleration sensors is provided on one of the wheels of the vehicle. Each of the first acceleration sensors works to generate a first acceleration signal as a function of a component of gravitational acceleration in a sensing direction thereof and output the first acceleration signal to a corresponding one of the transmitters.

Each of the second acceleration sensors is provided on one of the wheels of the vehicle such that a sensing direction thereof is different from that of a corresponding one of the first acceleration sensors. Each of the second acceleration sensors works to generate a second acceleration signal as a function of a component of gravitational acceleration in the sensing direction thereof and output the second acceleration signal to a corresponding one of the transmitters.

Each of the transmitters is configured to make a determination for a corresponding one of the wheels as to whether the wheel is a right-wheel or a left-wheel of the vehicle based on a difference in phase between the first and second acceleration signals outputted from a corresponding one of the first acceleration sensors and that of the second acceleration sensors.

Otherwise, each of the transmitters is configured to relay the first and second acceleration signals outputted from a corresponding one of the first acceleration sensors and that of the second acceleration sensors to the first receiver; the first receiver is configured to make a determination for each of the wheels as to whether the wheel is a right-wheel or a left-wheel of the vehicle based on a difference in phase between the first and second acceleration signals relayed from a corresponding one of the transmitters.

According to the fourth aspect of the invention, the tire inflation pressure sensing apparatus further includes a plurality of second receivers each of which is provided on one of the wheels of the vehicle.

Each of the second receivers has a first and a second antenna that are provided at different angular positions on a corresponding one of the wheels. Each of the second receivers works to receive a signal generated by a signal source that is located in the vehicle through both the first and second antennas thereof and provide a first and a second received signal to a corresponding one of the transmitters.

Each of the transmitters is configured to make a determination for a corresponding one of the wheels as to whether the wheel is a right-wheel or a left-wheel of the vehicle based on a difference in phase between the first and second received signals provided by a corresponding one of the second receivers.

Otherwise, each of the transmitters is configured to relay the first and second received signals provided by a corresponding one of the second receivers to the first receiver; the first receiver is configured to make a determination for each of the wheels of the vehicle as to whether the wheel is a right-wheel or a left-wheel of the vehicle based on a difference in phase between the first and second received signals relayed from a corresponding one of the transmitters.

In the above tire inflation pressure sensing apparatus, each of the transmitters may be configured to make a further determination for the corresponding one of the wheels as to whether the wheel is a front-wheel or a rear-wheel of the vehicle based on a level of the first and second received signals provided by the corresponding one of the second receivers.

Otherwise, the first receiver may be configured to make a further determination for each of the wheels of the vehicle as to whether the wheel is a front-wheel or a rear-wheel of the vehicle based on a level of the first and second received signals relayed from the corresponding one of the transmitters.

In the above tire inflation pressure sensing apparatus, the first and second antennas of each of the second receivers are provided on the corresponding one of the wheels of the vehicle such that a position of the first antenna in an axial direction of the wheel is coincident with that of the second antenna.

In the above tire inflation pressure sensing apparatus, the signal source may be a noise source that generates a noise as the signal.

Further, the noise generated by the noise source may have a frequency within one of a voice band, a LF band, a HF band, a VHF band, and a UHF band.

In the above tire inflation pressure sensing apparatus, the signal source may be a specially designed one to generate the signal only for the tire inflation pressure sensing apparatus.

Otherwise, the signal source may be designed to generate the signal for performing a predefined operation of the vehicle, and the signal is utilizable for the tire inflation pressure sensing apparatus.

According to the fifth aspect of the invention, in the tire inflation pressure sensing apparatus, each of the transmitters is configured to send out at predetermined time intervals an ID signal representative of an identity thereof together with the pressure transmitting signal.

The first receiver is configured to accumulate the number of times that the first receiver receives an ID signal and determine whether a pressure transmitting signal accompanying the ID signal has been sent out from one of the transmitters provided in the vehicle or from a transmitter provided in other vehicles based on the accumulated number of times that the first receiver receives the ID signal.

Accordingly, the tire inflation pressure sensing apparatus according to the present invention can reliably detect the location of each of the transmitters (i.e., the location of each of the tires of the vehicle) without registering reference ID signals in the receiver, thus saving the time-consuming task and additional devices required for the registration of reference ID signals in the receiver 3.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings:

FIG. 16 is a chart illustrating the accumulated numbers of times that a receiver of a tire inflation pressure sensing apparatus according to the eighth embodiment of the invention receives ID signals sent out from different transmitters.

DESCRIPTION OF THE PREFERRED EMBODIMENTS

Figure 1:
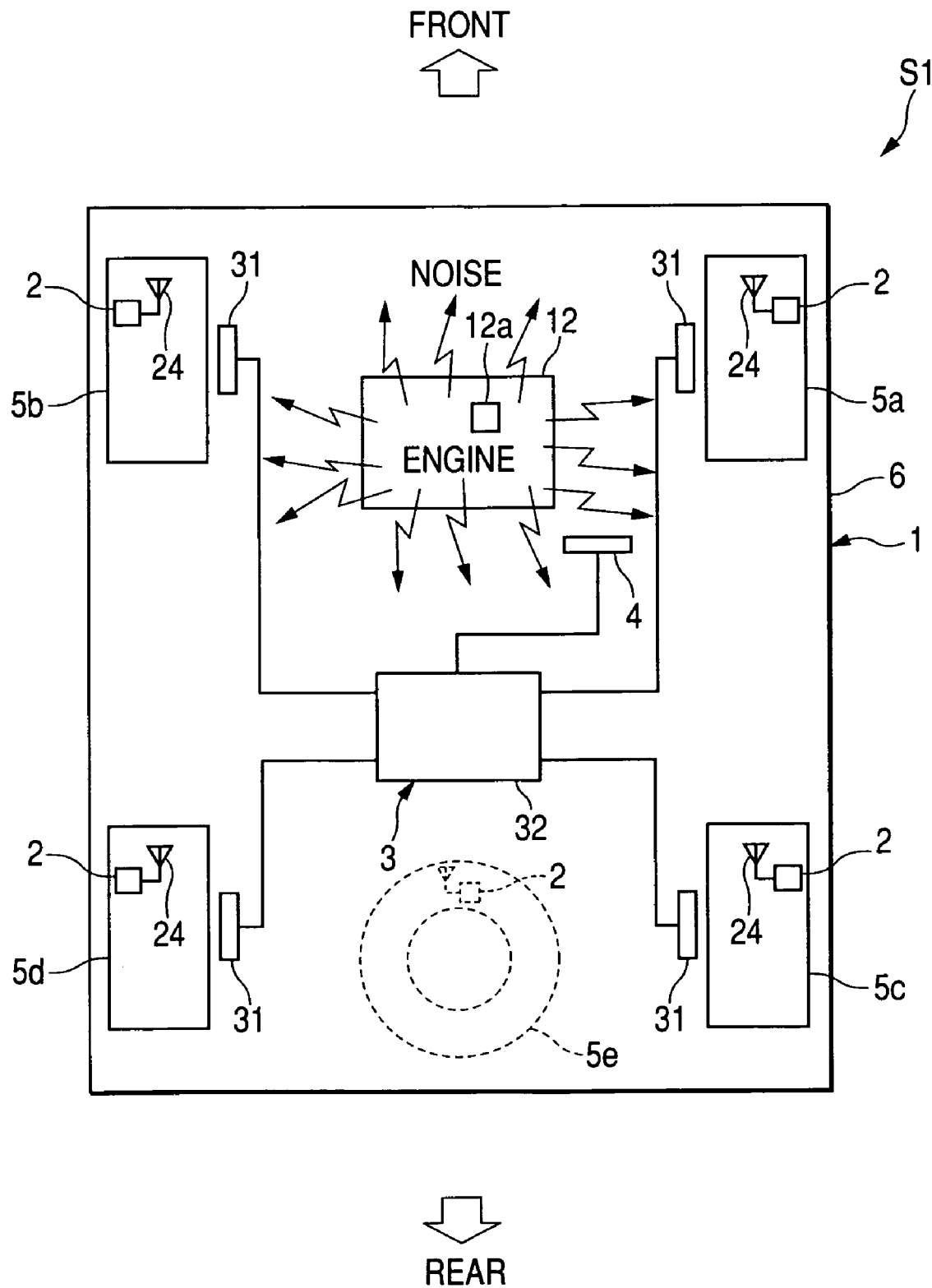
FIG. 1 is a schematic view illustrating the overall configuration of a tire inflation pressure sensing apparatus according to the first embodiment of the invention.

The preferred embodiments of the present invention will be described hereinafter with reference to FIGS. 1-16.

It should be noted that, for the sake of clarity and understanding, identical components having identical functions in different embodiments of the invention have been marked, where possible, with the same reference numerals in each of the figures.

First Embodiment

FIG. 1 shows the overall configuration of a tire inflation pressure sensing apparatus S1 according the first embodiment of the invention.

The tire inflation pressure sensing apparatus S1 is installed to a vehicle 1; it is configured to sense inflation pressures of four tires each of which is mounted on one of four wheels 5a-5d of the vehicle 1 (i.e., the front-right wheel 5a, the front-left wheel 5b, the rear-right wheel 5c, and the rear-left wheel 5d).

As shown in FIG. 1, the tire inflation pressure sensing apparatus S1 includes four transmitters 2, each of which is installed to one of the four wheels 5a-5d, a receiver 3 installed to the body 6 of the vehicle 1, and a warning device 4 electrically connected to the receiver 3.

Each transmitter 2 is configured to sense an inflation pressure of a corresponding one of the four tires and send out a frame that contains a signal representative of the sensed inflation pressure of the tire.

Figure 2A:
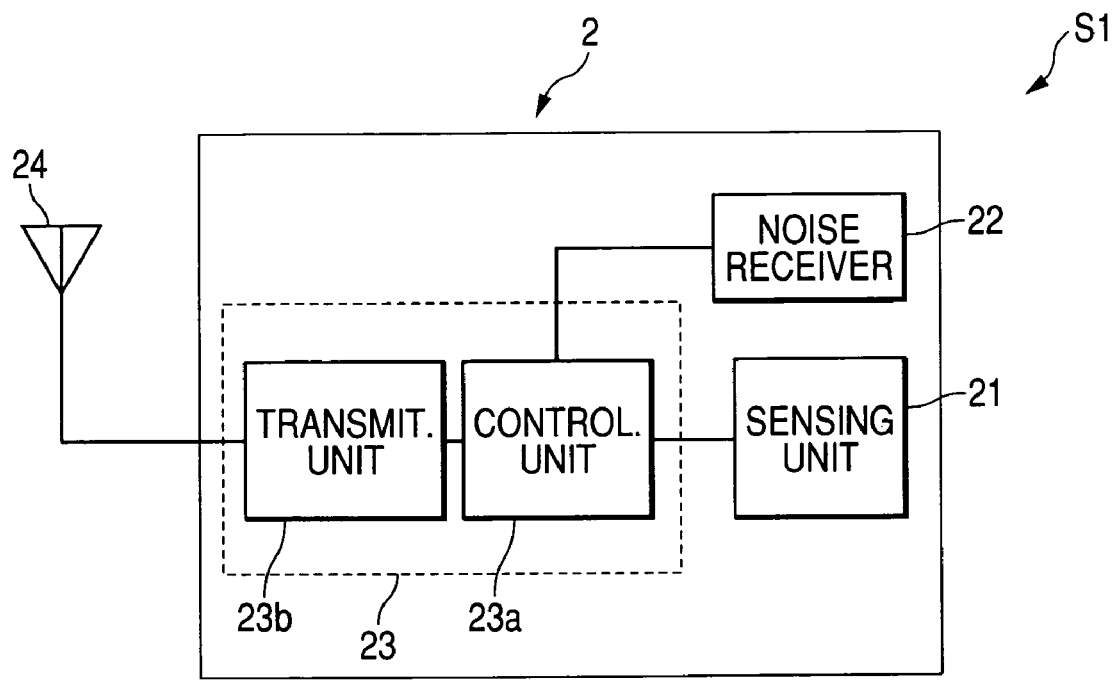
FIG. 2A is a block diagram showing the overall configuration of a transmitter of the tire inflation pressure sensing apparatus of FIG. 1.

Referring to FIG. 2A, each transmitter 2 includes a sensing unit 21, a noise receiver 22, a microcomputer 23, and an antenna 24.

The sensing unit 21 is configured with sensors, such as a diaphragm-type pressure sensor and a temperature sensor, and works to output signals representative of the sensed inflation pressure of the tire and the temperature of air in the tire.

The noise receiver 22 works to receive a noise generated by a given noise source located in the vehicle 1 and provide the received noise to the microcomputer 23. The noise source may be an engine ECU 12a mounted on an engine 12 of the vehicle 1 as shown in FIG. 1, a component of an ignition system of the vehicle 1, or one of other ECUs provided in the vehicle 1. The noise receiver 22 is configured with an antenna (not shown) through which it receives the noise.

The microcomputer 23 is of a well-known type and functionally includes a controlling unit 23a and a transmitting unit 23b. The microcomputer 23 is configured to implement predetermined processes in accordance with a program installed in a memory thereof (not shown).

Specifically, the controlling unit 23a receives signals outputted from the sensing unit 21 and processes those signals. Then, the controlling unit 23a stores in a frame those signals and provides the frame to the transmitting unit 23b at predetermined time intervals.

Further, the controlling unit 23a detects the location of the corresponding transmitter 2 in the vehicle 1 based on the noise provided by the noise receiver 22. More specifically, the controlling unit 23a determines whether the wheel to which the transmitter 2 is installed is a front-wheel or a rear-wheel of the vehicle 1 based on a level of the noise.

Figure 3A:
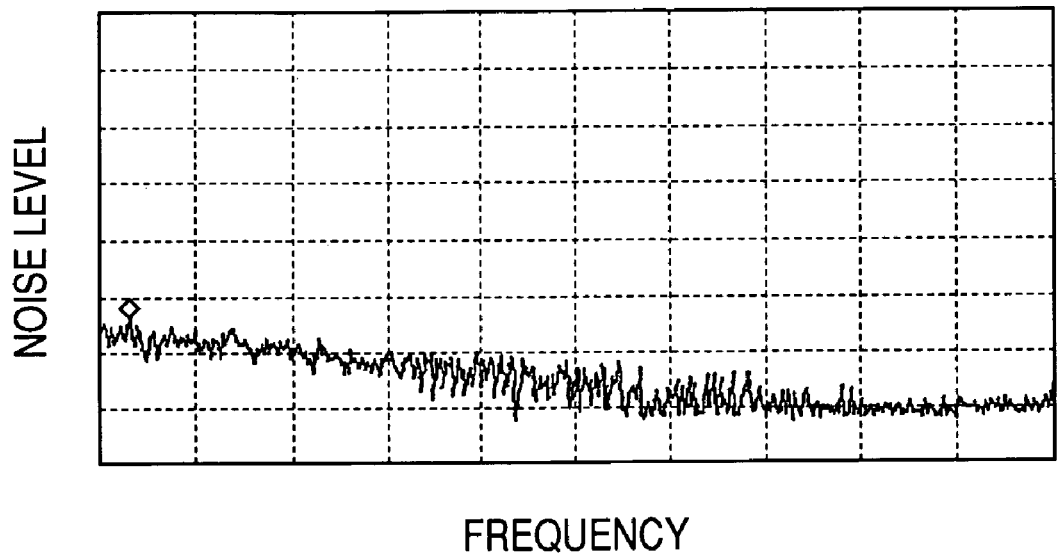
FIG. 3A is a view illustrating a noise received by a noise receiver of a transmitter, which is installed to a front-wheel of a vehicle, of the tire inflation pressure sensing apparatus of FIG. 1.
Figure 3B:
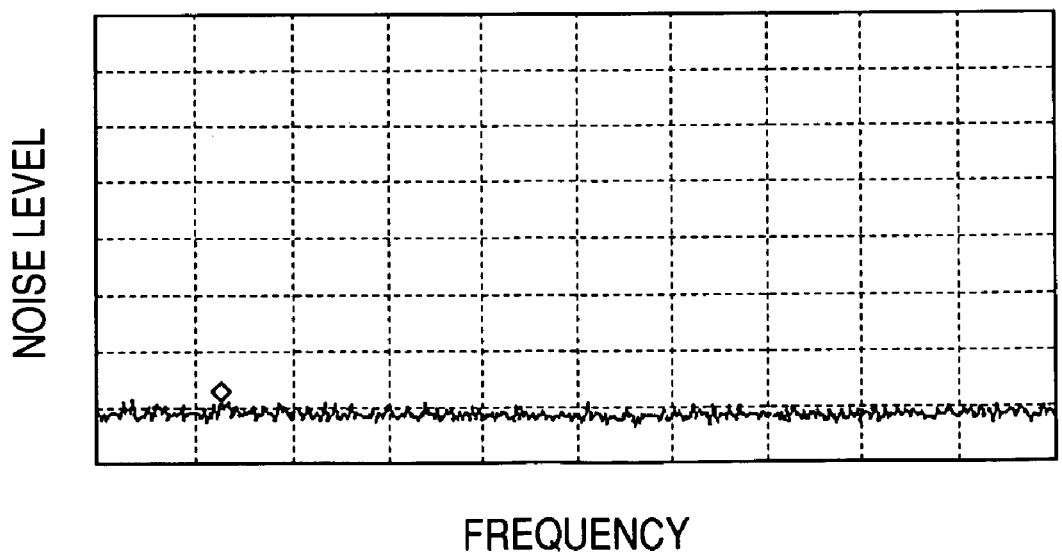
FIG. 3B is a view illustrating a noise received by a noise receiver of a transmitter, which is installed to a rear-wheel of the vehicle, of the tire inflation pressure sensing apparatus of FIG. 1.

FIG. 3A shows the level of the noises received by transmitters 2 that are installed to the front-wheels 5a and 5b, while FIG. 3B shows that received by the other transmitters 2 that are installed to the rear-wheels 5c and 5d.

It is easy to understand that the level of the noise received by a transmitter 2 is dependant on the distance from the noise source to the transmitter 2. For example, when the noise source is defined as the engine ECU 12a that is located in front part of the vehicle 1 as shown in FIG. 1, the distance from it to a front-wheel 5a or 5b is shorter than that to a rear-wheel 5c or 5d. Consequently, as shown in FIGS. 3A-3B, the level of the noises received by the transmitters 2 installed to the wheels 5a and 5b is higher than that received by the transmitters 2 installed to the wheels 5c and 5d.

Accordingly, it is possible for each of the transmitters 2 to make a determination for the wheel to which it is installed as to whether the wheel is a front-wheel or a rear-wheel of the vehicle 1 based on the level of the noise received thereby.

Specifically, each of the transmitters 2 has a predetermined threshold of noise level stored in the memory of the microcomputer 23 thereof. The threshold is so determined that it is between an estimated minimum level of the noise received by a transmitter 2 that is installed to a rear-wheel 5c or 5d and an estimated maximum level of the noise received by a transmitter 2 that is installed to a front-wheel 5a or 5b.

The controlling unit 23a of each of the transmitters 2 compares the level of the noise provided by the noise receiver 22 with the threshold and determines whether the wheel to which the transmitter 2 is installed is a front-wheel or a rear-wheel of the vehicle 1 based on the comparison result.

After the determination, the controlling unit 23a stores in a frame a location signal representative of the determination results together with signals representative of the sensing results from the sensing unit 21 and provides the frame to the transmitting unit 23b.

The transmitting unit 23b sends out the frame through the antenna 24 toward the receiver 3 at predetermined intervals, for example, of 1 minute.

Additionally, each transmitter 2 is fixed, for example, to an air valve of a corresponding one of the wheels of the vehicle 1 and at least the sensing unit 21 thereof is placed inside the tire so as to be exposed to the air in the tire.

The receiver 3 is configured to receive frames, each of which is sent out from one of the four transmitters 2, and determine the inflation pressures of the four tires based on the signals contained in those frames.

Figure 2B:
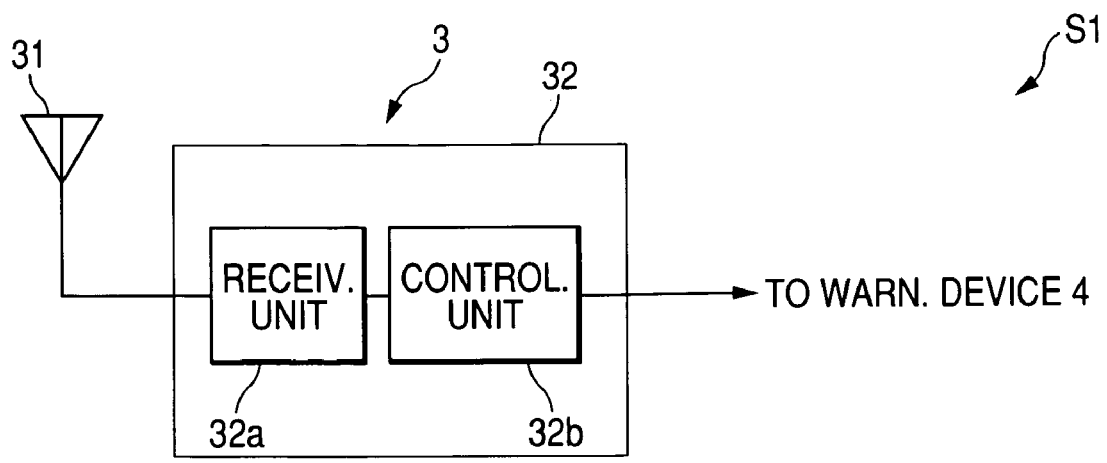
FIG. 2B is a block diagram showing the overall configuration of a receiver of the tire inflation pressure sensing apparatus of FIG. 1.

Referring to FIG. 2B, the receiver 3 includes at least one antenna 31 and a microcomputer 32.

In this embodiment, four antennas 31 are employed as shown in FIG. 1. Each antenna 31 is provided at a position on the body 6 of the vehicle 1 corresponding to one of the four transmitters 2. For example, each antenna 31 is positioned away from the corresponding transmitter 2 by a given distance and fixed to the body 6 of the vehicle 1.

The microcomputer 32 is of a well-known type and functionally includes a receiving unit 32a and a controlling unit 32b. The microcomputer 32 is configured to implement predetermined processes in accordance with a program installed in a memory thereof (not shown).

Specifically, the receiving unit 32a receives frames sent out from the transmitters 2 through the respective antennas 31 and provides those frames to the controlling unit 32b.

The controlling unit 32b analyzes each of the location signals contained in those frames provided by the receiving unit 32a and identifies whether a corresponding one of the four wheels (i.e., the wheel to which the transmitter 2 having sent out the frame is installed) is a front-wheel or a rear-wheel of the vehicle 1.

Then, the controlling unit 32b determines each of the inflation pressures of the four tires through performing signal processing and calculations based on the signals contained in a corresponding one of the frames.

After that, the controlling unit 32b compares each of the determined inflation pressures of the four tires with a predefined threshold of inflation pressure and outputs a warning signal to the warning device 4 when it is lower than the predefined threshold. The warning signal is indicative of a decrease in the inflation pressure of a front-wheel or a rear-wheel of the vehicle 1.

The warning device 4 is arranged, as shown in FIG. 1, in a place that is visible for the driver of the vehicle 1. The warning device 4 may be configured with at least one of a warning lamp, a warning display, both of which may be disposed in the instrument panel of the vehicle 1, and a warning buzzer. The warning device 4 informs the decrease in the inflation pressure of a front-wheel or a rear-wheel of the vehicle 1 to the driver upon receiving the warning signal outputted from the controlling unit 32b.

To sum up, the tire inflation pressure sensing apparatus S1 according to the present embodiment includes four transmitters 2, each of which is installed to one of the four wheels 5*a*-5*d* of the vehicle 1, and a receiver 3 installed to the body 6 of the vehicle 1.

Each transmitter 2 includes a sensing unit 21, which works to sense an inflation pressure of a tire mounted on a corresponding one of the wheels, and is configured to send out a frame in which a pressure signal representative of the inflation pressure of the tire sensed by the sensing unit 21 is contained.

The receiver 3 includes four antennas 31, each of which corresponds to one of the four transmitters 2, and is configured to receive the frames transmitted from the transmitters 2 through the respective antennas 31 and determine the inflation pressures of the four tires based on the received frames.

The tire inflation pressure sensing apparatus S1 is characterized in that:

each transmitter 2 further includes a noise receiver 22 that works to receive a noise generated by a noise source located in the vehicle 1; and each transmitter 2 is configured to determine whether a corresponding one of the four wheels (i.e., the wheel to which the transmitter 2 is installed) is a front-wheel or a rear-wheel of the vehicle 1 based on a level of the noise received by the noise receiver 22 thereof and stores in the frame a location signal representative of the determination results together with the pressure signal.

With the above arrangement, the receiver 3 can identify, for each of the transmitters 2, whether the transmitter 2 is installed to a front-wheel or a rear-wheel of the vehicle 1 based on a corresponding one of the location signals instead of an ID signal specific to the transmitter 2.

Consequently, all the transmitters 2 can be configured in the same way without having specific ID signals different from each other.

Moreover, the receiver 3 does not necessitate reference ID signals registered therein, thus saving the time-consuming task and additional devices required for the registration of reference ID signals in the receiver 3.

In addition, in the case that the vehicle 1 is further equipped with a spare wheel 5*e* in addition to the four wheels 5*a*-5*d*, it is still possible to sense an inflation pressure of the tire mounted on the spare wheel 5*e* using another transmitter 2 installed to the spare wheel 5*e*. In such case, since the distance from the noise source to the spare wheel 5*e* is different from those to a front-wheel and a rear-wheel of the vehicle 1, the location of the spare wheel 5*e* can also be detected based on a level of the noise received by the noise receiver 22 of the transmitter 2.

Second Embodiment

In this embodiment, a tire inflation pressure sensing apparatus S2 is provided which has a configuration almost identical to that of the inflation pressure sensing apparatus S1 according to the previous embodiment. Accordingly, only the difference in configuration between the tire inflation pressure sensing apparatuses S1 and S2 is to be described below.

As described previously, in the tire inflation pressure sensing apparatus S1, each of the transmitters 2 is configured to determine whether a corresponding one of the four wheels (i.e., the wheel to which the transmitter 2 is installed) is a front-wheel or a rear-wheel of the vehicle 1 based on a level of the noise received by the noise receiver 22 thereof and send out a frame containing a location signal representative of the determination results. On the other hand, the receiver 3 is configured to receive each of the frames sent out from the transmitters 2 and identify whether a corresponding one of the transmitters 2 (i.e., the transmitter 2 having sent out the frame) is installed to a front-wheel or a rear-wheel of the vehicle 1.

In comparison, in the tire inflation pressure sensing apparatus S2, each of the transmitters 2 is configured to relay the noise received by the noise receiver 22 thereof to the receiver 3, while the receiver 3 is configured to determine, for each of the transmitters 2, whether the transmitter 2 is installed to a front-wheel or a rear-wheel of the vehicle 1 based on a level of the noise relayed from the transmitter 2.

Accordingly, the controlling unit 23*a* of each of the transmitters 2 is configured not to make the determination as to whether the transmitter 2 is installed to a front-wheel or a left-wheel of the vehicle 1. Instead, the controlling unit 32*b* of the receiver 3 is configured to make the determination for each of the transmitters 2. Further, the receiver 3 may have a predetermined threshold of noise level stored in the memory of the microcomputer 32 thereof for making the determination.

Thus, the determination for each of the transmitters 2 as to whether the transmitter 2 is installed to a front-wheel or a left-wheel of the vehicle 1 can be accomplished through sending out from the transmitter 2 the noise instead of an ID signal.

In addition, the tire inflation pressure sensing apparatus S2 according to the present embodiment may also be configured to sense an inflation pressure of a tire mounted on a spare wheel 5*e* in addition to those of tires mounted on the wheels 5*a*-5*d*.

Third Embodiment

In this embodiment, a tire inflation pressure sensing apparatus S3 is provided which has a configuration almost identical to that of the inflation pressure sensing apparatus S1 according to the first embodiment. Accordingly, only the difference in configuration between the tire inflation pressure sensing apparatuses S1 and S3 is to be described below.

In the tire inflation pressure sensing apparatus S1 according to the first embodiment, a noise generated by a noise source located in the vehicle 1 is utilized to make a determination for each of the transmitters 2 as to whether the transmitter 2 is installed to a front-wheel or a rear-wheel of the vehicle 1.

In comparison, in the tire inflation pressure sensing apparatus S3, an acceleration signal generated by an acceleration sensor (to be referred to as G sensor hereinafter) of each of the transmitters 2 is used to determine whether the transmitter 2 is installed to a right-wheel of a left-wheel of the vehicle 1.

Figure 4A:
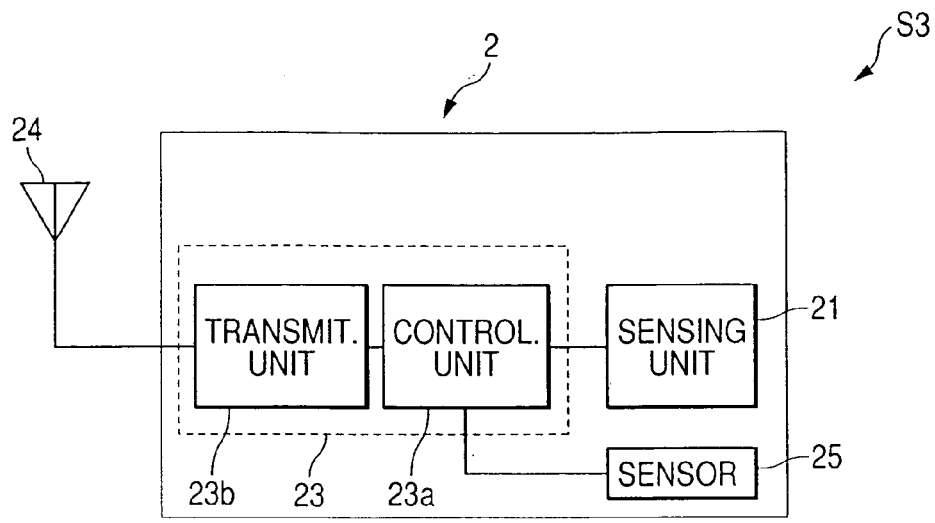
FIG. 4A is a block diagram showing the overall configuration of a transmitter of a tire inflation pressure sensing apparatus according to the third embodiment of the invention.

FIG. 4A shows the overall configuration of each of the transmitters 2 of the tire inflation pressure sensing apparatus S3, in which a G sensor 25 is provided instead of a noise receiver 22 as shown in FIG. 2A.

Figure 4B:
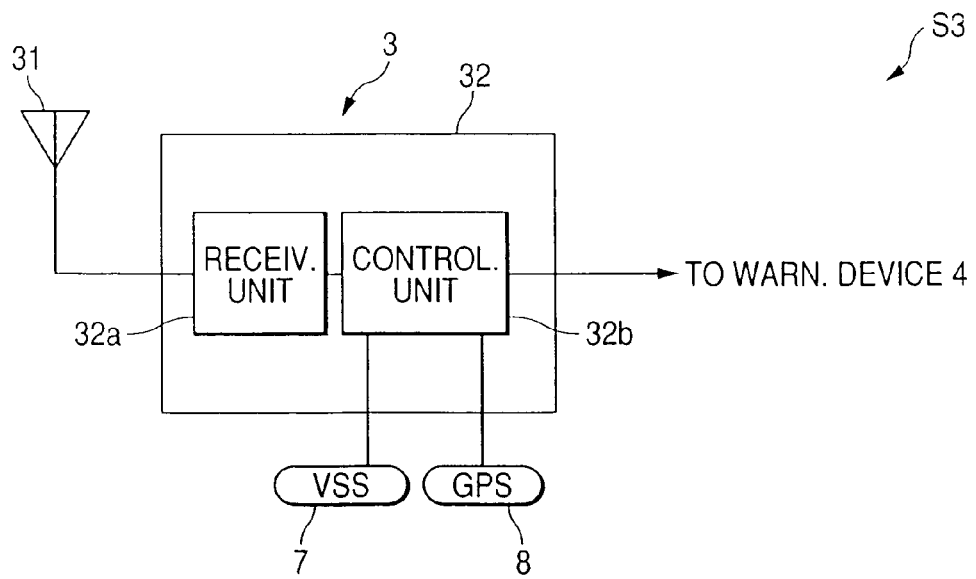
FIG. 4B is a block diagram showing the overall configuration of a receiver of the tire inflation pressure sensing apparatus according to the third embodiment of the invention.

FIG. 4B shows the overall configuration of the receiver 3 of the tire inflation pressure sensing apparatus S3, to which a vehicle speed signal from a vehicle speed sensor 7 of the vehicle 1 and a gear position signal from a gear position sensor 8 of the same are provided.

Figure 5A:
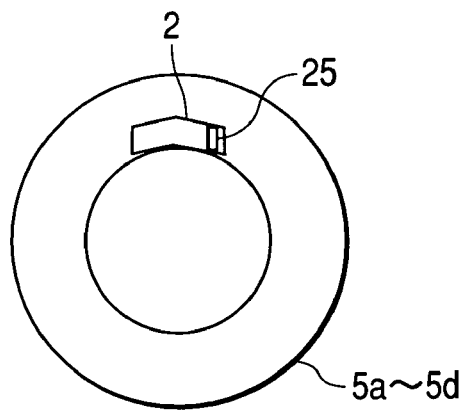
FIGS. 5A-5C are schematic views illustrating an arrangement of acceleration sensors of the tire inflation pressure sensing apparatus according to the third embodiment of the invention on wheels of a vehicle.
Figure 5B:
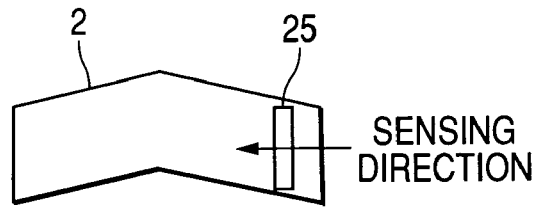

In reference to FIGS. 5A-5B, the G sensor 25 is arranged on the corresponding wheel of the vehicle 1 such that the sensing direction of the G sensor 25 coincides with a circumferential direction of the wheel.

With such an arrangement, when the vehicle 1 runs at a constant speed, only a component of gravitational force G acts on the G sensor 25 in the sensing direction thereof.

However, when the vehicle 1 accelerates forward or backward, a turning force T also acts on the G sensor 25 in the sensing direction thereof in addition to the component of gravitational force G.

Figure 5C:
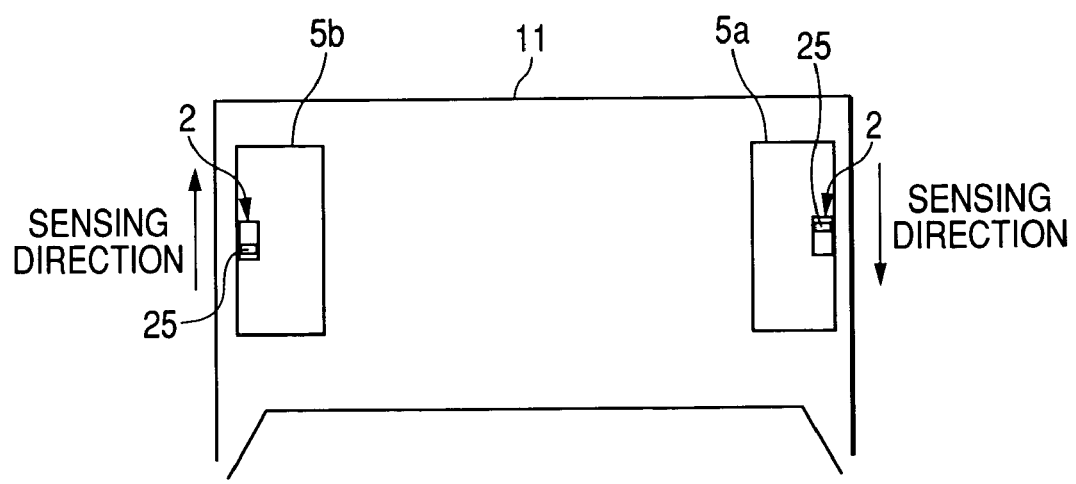

In the tire inflation pressure sensing apparatus S3, all the G sensors 25 of the transmitters 2 are arranged in the same way as described above. Further, as shown in FIG. 5C, the sensing direction of a G sensor 25 arranged on a right-wheel 5a or 5c is opposite to that of a G sensor 25 arranged on a left-wheel 5b or 5d.

Consequently, when the vehicle 1 accelerates forward with a large enough acceleration, the acceleration sensed by the G sensor 25 arranged on a right-wheel 5a or 5c has a positive value, while that sensed by the G sensor 25 arranged on a left-wheel 5b or 5d has a negative value. On the contrary, when the vehicle 1 accelerates backward with a large enough acceleration, the acceleration sensed by the G sensor 25 arranged on a left-wheel 5b or 5d has a positive value, while that sensed by the G sensor 25 arranged on a right-wheel 5a or 5c has a negative value.

Thus, it is possible to determine for each of the transmitters 2 whether the wheel to which the transmitter 2 is installed is a right-wheel or a left-wheel of the vehicle 1 based on the acceleration signal generated by the G sensor 25 of the transmitter 2 and the traveling direction of the vehicle 1.

Referring back to FIG. 4A, the controlling unit 23a of each of the transmitters 2 is configured to receive the acceleration signal generated by the G sensor 25 and process the acceleration signal. Then, the controlling unit 23a stores in a frame the acceleration signal together with signals representative of the sensing results from the sensing unit 21 and provides the frame to the transmitting unit 23b.

The transmitting unit 23b is configured to send out the frame through the antenna 24 toward the receiver 3 at predetermined intervals, for example, of 1 minute.

Referring now to FIG. 4B, the receiver 3 is configured to receive frames, each of which is sent out from one of the four transmitters 2, through at least one antenna 31 thereof and determine inflation pressures of tires based on the signals contained in those frames.

In addition, the receiver 3 is configured to receive a vehicle speed signal from the vehicle speed sensor 7 and a gear position signal from the gear position sensor 8.

Then, the receiver 3 determines whether the vehicle 1 runs forward or backward based on the gear position signal. More specifically, when the gear position sensed by the gear position sensor 8 corresponds to one of the "D" position, "2" position, and "1" position, the receiver 3 determines that the vehicle 1 runs forward. On the contrary, when the gear position sensed by the gear position sensor 8 corresponds to "R" position, the receiver 3 determines that the vehicle 1 runs backward.

Further, since the vehicle 1 generally accelerates with a considerably large acceleration when it starts running, the receiver 3 makes a determination as to whether the vehicle 1 is starting running based on the vehicle speed signal provided by the vehicle speed sensor 8.

After that, the receiver 3 makes a determination for each of the transmitters 2 as to whether the wheel to which the transmitter 2 is installed is a right-wheel or a left-wheel of the vehicle 1 based on the acceleration signal contained in the frame sent out from the transmitter 2 and the vehicle speed signal from the vehicle speed sensor 7 and the gear position signal from the gear position sensor 8.

Accordingly, in the tire inflation pressure sensing apparatus S6, the receiver 3 can identify, for each of the transmitters 2, whether the transmitter 2 is installed to a right-wheel or a left-wheel of the vehicle 1 based on a corresponding acceleration signal instead of an ID signal specific to the transmitter 2.

In addition, since a spare wheel 5e of the vehicle 1 does not rotate with running of the vehicle 1, the acceleration signal generated by a G sensor 25 arranged on the spare wheel 5e is different from that generated by any of the G sensors 25 arranged on the four wheels 5a-5d of the vehicle 1. Consequently, the location of the spare wheel 5e in the vehicle 1 can also be detected based on the acceleration signal generated by the corresponding G sensor 25.

It should be noted that other sensors, for example a wheel speed sensor, may also be used to determine whether the vehicle 1 is starting running instead of the vehicle speed sensor 7. Further, when the wheel speed sensor is configured to be able to sense the rotational direction of the wheel as well, the gear position sensor 8 then become unnecessary.

Fourth Embodiment

In this embodiment, a tire inflation pressure sensing apparatus S4 is provided which has a configuration almost identical to that of the inflation pressure sensing apparatus S1 according to the first embodiment. Accordingly, only the difference in configuration between the tire inflation pressure sensing apparatuses S1 and S4 is to be described below.

Figure 6A:
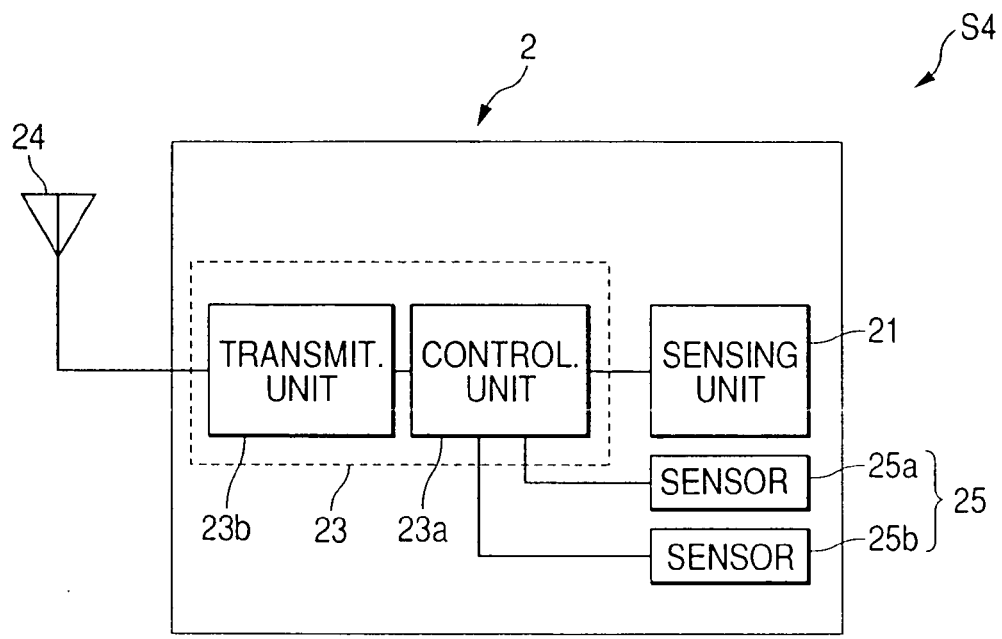
FIG. 6A is a block diagram showing the overall configuration of a transmitter of a tire inflation pressure sensing apparatus according to the fourth embodiment of the invention.

FIG. 6A shows the overall configuration of each of the transmitters 2 of the tire inflation pressure sensing apparatus S4. As shown in the figure, each transmitter 2 includes two G sensors 25a and 25b instead of a noise receiver 22 as shown in FIG. 2A.

Figure 6B:
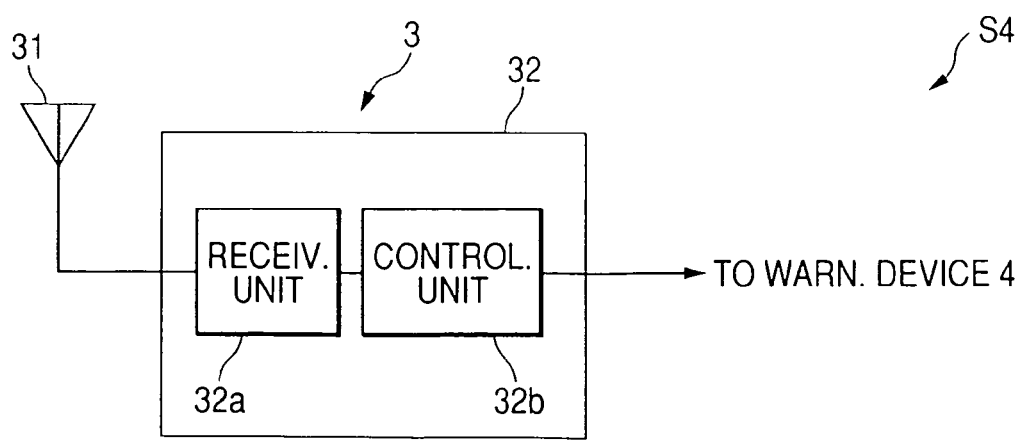
FIG. 6B is a block diagram showing the overall configuration of a receiver of the tire inflation pressure sensing apparatus according to the fourth embodiment of the invention.

FIG. 6B shows the overall configuration of the receiver 3 of the tire inflation pressure sensing apparatus S3, which is identical to that of the tire inflation pressure sensing apparatus S1.

Figure 7:
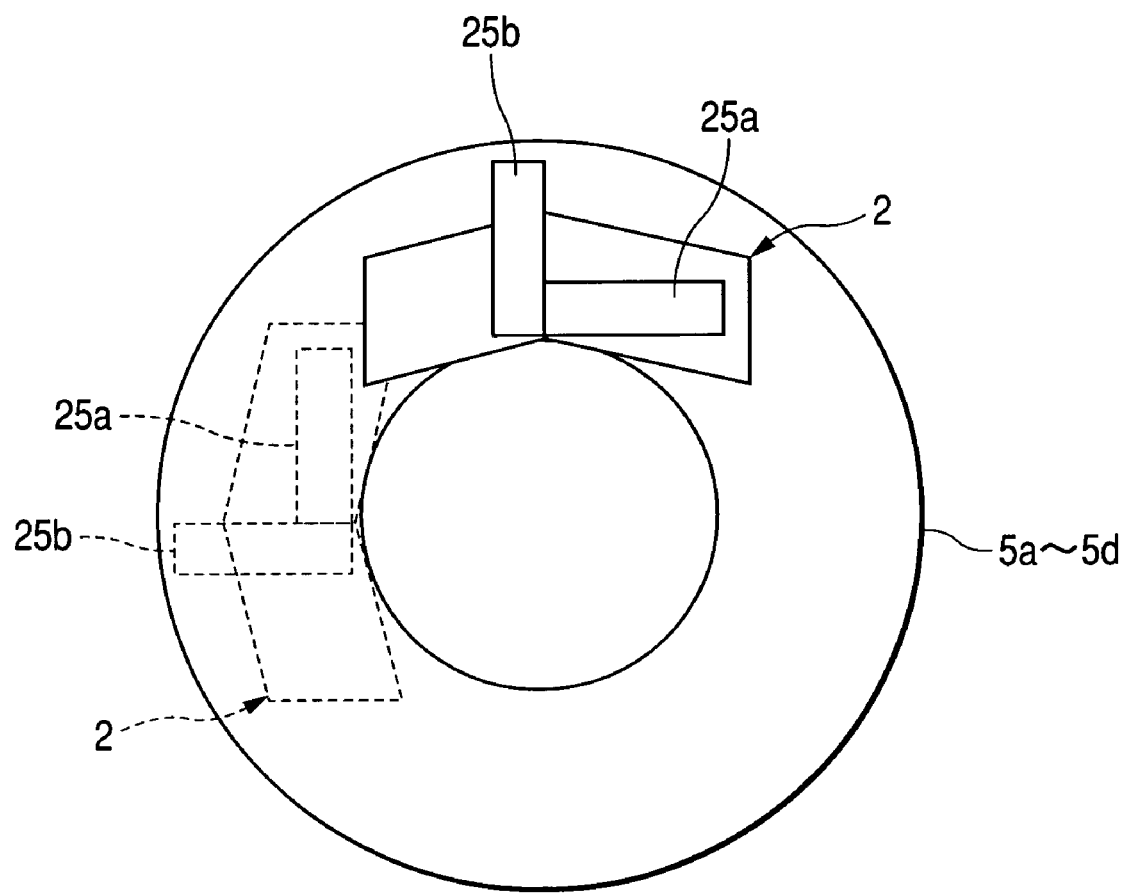
FIG. 7 is a schematic view illustrating an arrangement of a first and a second acceleration sensor of a transmitter of the tire inflation pressure sensing apparatus according to the fourth embodiment of the invention on a wheel of a vehicle.

In reference to FIG. 7, the two G sensors 25a and 25b are arranged on the corresponding wheel of the vehicle 1 such that the sensing direction of the G sensor 25a coincides with a radial direction of the wheel, while that of the G sensor 25b coincides with a circumferential direction of the same.

With such an arrangement, when the vehicle 1 runs at a constant speed, a certain amount of centrifugal acceleration and a component of gravitational acceleration in the sensing direction of the G sensor 25a, which varies with rotation of the wheel, act on the G sensor 25a. On the other hand, only a component of gravitational acceleration acts on the G sensor 25b in the sensing direction thereof, which also varies with rotation of the wheel.

Since the centrifugal acceleration acting on the G sensor 25a has a constant value regardless of rotation of the wheel, each of the transmitters 2 is configured to perform a process of canceling a DC offset representative of the centrifugal acceleration from the acceleration signal generated by the G sensor 25a. However, for the sake of brevity, the resultant signal is also to be referred to as the acceleration signal generated by the G sensor 25a hereinafter.

Figure 8A:
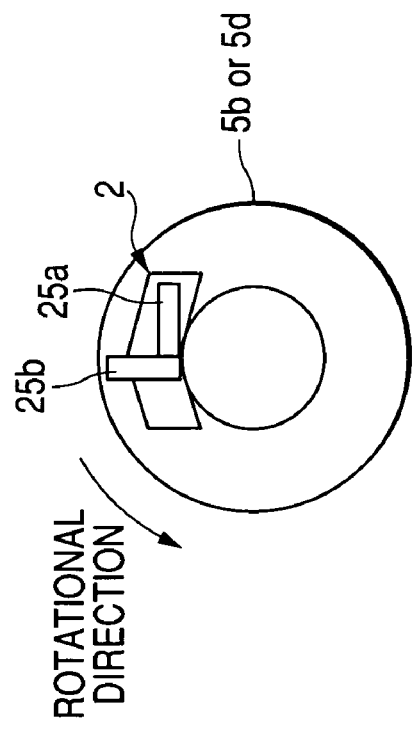
FIG. 8A is a view illustrating a difference in phase between a first and a second acceleration signal generated by a first and a second acceleration sensor of a transmitter, which is installed to a right-wheel of a vehicle, of the tire inflation pressure sensing apparatus according to the fourth embodiment of the invention.

FIG. 8A shows the acceleration signals generated by the G sensors 25a and 25b of a transmitter 2 that is installed to a right-wheel 5a or 5c of the vehicle 1.

As seen from FIG. 8A, there is a difference in phase between the acceleration signal generated by the G sensor 25a and that generated by the G sensor 25b. More specifically, the phase of the acceleration signal from the G sensor 25a precedes that from the G sensor 25b by 90°. This is due to the difference in sensing direction between the two G sensors 25a and 25b.

Figure 8B:
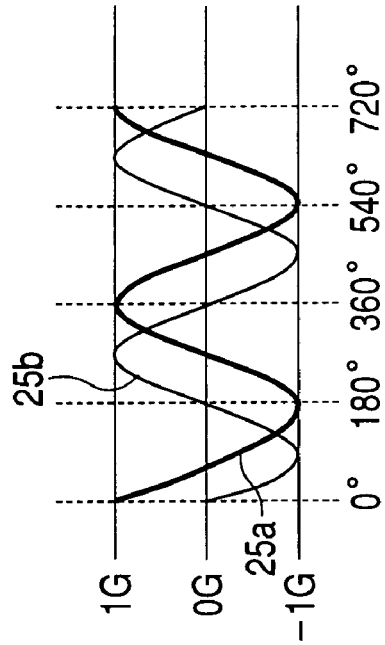
FIG. 8B is a view illustrating a difference in phase between a first and a second acceleration signal generated by a first and a second acceleration sensor of a transmitter, which is installed to a left-wheel of the vehicle, of the tire inflation pressure sensing apparatus according to the fourth embodiment of the invention.

On the other hand, FIG. 8b shows the acceleration signals generated by the G sensors 25a and 25b of a transmitter 2 that is installed to a left-wheel 5b or 5d of the vehicle 1.

It can be seen that the rotational direction of the wheel relative to the G sensors 25a and 25b in FIG. 8B is opposite to that in FIG. 8A due to the difference in location between a right-wheel and a left-wheel of the vehicle 1.

As seen from FIG. 8B, there is also a difference in phase between the acceleration signals generated by the G sensors 25a and 25b. However, in FIG. 8B, the phase of the acceleration signal from the G sensor 25b precedes that from the G sensor 25a by 90°.

Thus, it is possible to determine for each of the transmitters 2 whether the wheel to which the transmitter 2 is installed is a right-wheel or a left-wheel of the vehicle 1 based on the difference in phase between the acceleration signals generated by the G sensors 25a and 25b thereof.

Specifically, the controlling unit 23a of each of the transmitters 2 determines the difference in phase in accordance with a program installed in the memory of the microcomputer 23. Then, based on the determined difference in phase, the controlling unit 23a further make a determination as to whether the wheel to which the transmitter 2 is installed is a right wheel or a left-wheel of the vehicle 1.

After the determination, the controlling unit 23a stores in a frame a location signal representative of the determination results together with signals representative of the sensing results from the sensing unit 21 and provide the frame to the transmitting unit 23b.

The transmitting unit 23b sends out the frame through the antenna 24 toward the receiver 3 at predetermined intervals, for example, of 1 minute.

The receiving unit 32a of the receiver 3 receives frames sent out from the transmitters 2 through at least one antenna 31 and provides those frames to the controlling unit 32b.

The controlling unit 32b analyzes each of the location signals contained in those frames provided by the receiving unit 32a and identify whether a corresponding one of the four wheels (i.e., the wheel to which the transmitter 2 having sent out the frame is installed) is a right-wheel or a left-wheel of the vehicle 1.

Further, the controlling unit 32b determines each of the inflation pressures of the four tires through performing signal processing and calculations based on the signals contained in a corresponding one of the frames.

Figure 9:
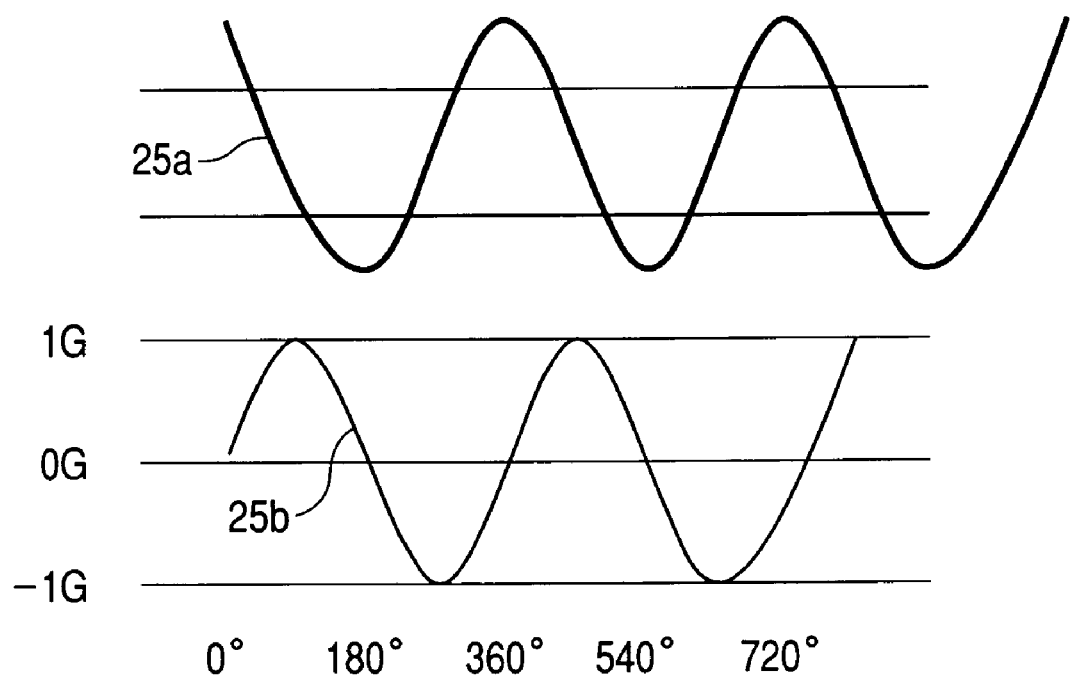
FIG. 9 is a view illustrating a first and a second acceleration signal generated by a first and a second acceleration sensor of a transmitter, which is installed to a wheel of a vehicle, of the tire inflation pressure sensing apparatus according to the fourth embodiment of the invention without canceling a DC offset representative of a centrifugal acceleration of the wheel.

In addition, FIG. 9 shows the acceleration signal generated by the G sensor 25a without canceling the DC offset representative of the centrifugal acceleration therefrom. In this case, though the acceleration signal generated by the G sensor 25a lies in higher position than that generated by the G sensor 25b in FIG. 9, the difference in phase between the two acceleration signals is equal to that in FIG. 8B.

Moreover, as the tire inflation pressure sensing apparatus S3 of the third embodiment, the tire inflation pressure sensing apparatus S4 of the present embodiment can also detect the location of a spare wheel 5e in the vehicle 1 in addition to those of the four wheels 5a-5d.

Fifth Embodiment

In this embodiment, a tire inflation pressure sensing apparatus S5 is provided which has a configuration almost identical to that of the inflation pressure sensing apparatus S4 according to the fourth embodiment. Accordingly, only the difference in configuration between the tire inflation pressure sensing apparatuses S4 and S5 is to be described below.

As described previously, in the tire inflation pressure sensing apparatus S4, each of the transmitters 2 is configured to determine whether a corresponding one of the four wheels (i.e., the wheel to which the transmitter 2 is installed) is a right-wheel or a left-wheel of the vehicle 1 based on a difference in phase between two acceleration signals respectively generated by the G sensors 25a and 25b and send out a frame containing a location signal representative of the determination results. On the other hand, the receiver 3 is configured to receive each of the frames sent out from the transmitters 2 and identify whether a corresponding one of the transmitters 2 (i.e., the transmitter 2 having sent out the frame) is installed to a right-wheel or a left-wheel of the vehicle 1.

In comparison, in the tire inflation pressure sensing apparatus S5, each of the transmitters 2 is configured to relay the two acceleration signals respectively generated by the G sensors 25a and 25b to the receiver 3, while the receiver 3 is configured to determine, for each of the transmitters 2, whether the transmitter 2 is installed to a right-wheel or a left-wheel of the vehicle 1 based on a difference in phase between the two acceleration signals relayed from the transmitter 2.

Accordingly, the controlling unit 23a of each of the transmitters 2 is configured not to make the determination as to whether the transmitter 2 is installed to a right-wheel or a left-wheel of the vehicle 1. Instead, the controlling unit 32b of the receiver 3 is configured to make the determination for each of the transmitters 2.

Further, in the case that the determination is made through determining whether the difference in phase has a positive or a negative value, the receiver 3 may have a predetermined criterion stored in the memory of the microcomputer 32 for determining whether the difference in phase has a positive or negative value.

Thus, the determination for each of the transmitters 2 as to whether the transmitter 2 is installed to a right-wheel or a left-wheel of the vehicle 1 can be accomplished through sending out from the transmitter 2 two acceleration signals respectively generated by the G sensors 25a and 25b instead of an ID signal specific to the transmitter 2.

Sixth Embodiment

In this embodiment, a tire inflation pressure sensing apparatus S6 is provided which has a configuration almost identical to those of the tire inflation pressure sensing apparatuses S1-S5 according to the previous embodiments. Accordingly, only the difference in configuration between the tire inflation pressure sensing apparatus S6 and those apparatuses S1-S5 is to be described below.

In the tire inflation pressure sensing apparatuses S1 and S2, a determination is made for each of the transmitters 2 as to whether the transmitter 2 is installed to a front-wheel or a rear-wheel of the vehicle 1. On the other hand, in the tire inflation pressure sensing apparatuses S3-S5, a determination is made for each of the transmitters 2 as to whether the transmitter 2 is installed to a right-wheel or a left-wheel of the vehicle 1.

In this embodiment, the tire inflation pressure sensing apparatus S6 is configured to determine, for each of the transmitters 2, whether the transmitter 2 is installed to a front-wheel or a rear-wheel of the vehicle 1 as well as whether that is installed to a right-wheel or a left-wheel of the same.

Figure 10A:
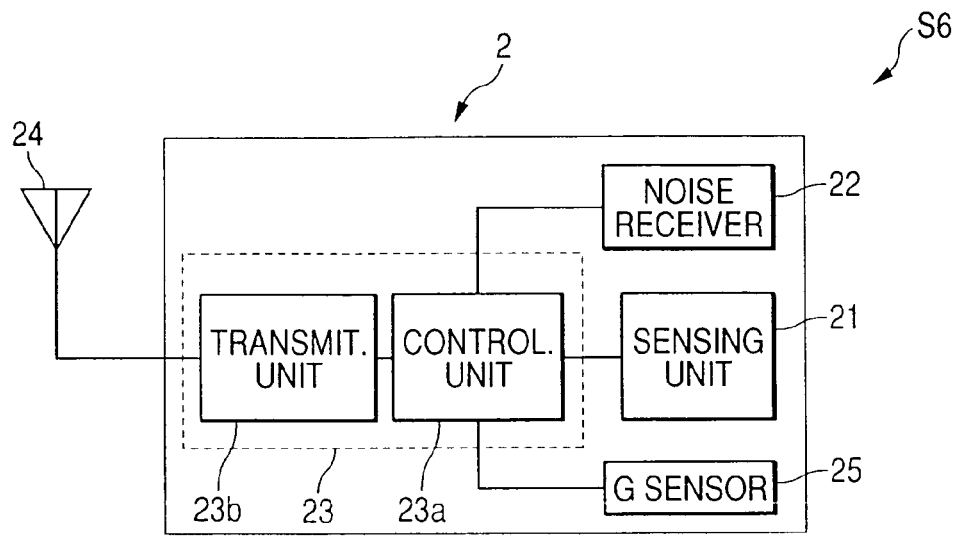
FIG. 10A is a block diagram showing the overall configuration of a transmitter of a tire inflation pressure sensing apparatus according to the sixth embodiment of the invention.

FIG. 10A shows the overall configuration of each of the transmitters 2 of the tire inflation pressure sensing apparatus S6, in which both a noise receiver 22 and a G sensor 25 are provided.

Figure 10B:
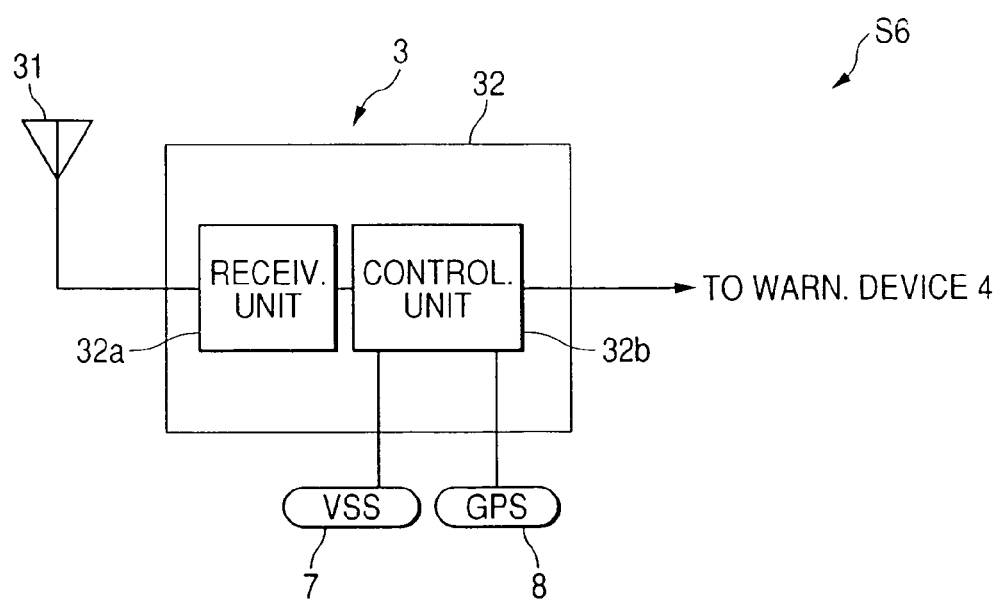
FIG. 10B is a block diagram showing the overall configuration of a receiver of the tire inflation pressure sensing apparatus according to the sixth embodiment of the invention.

FIG. 10B shows the overall configuration of the receiver 3 of the tire inflation pressure sensing apparatus S6, to which a vehicle speed signal from a vehicle speed sensor 7 of the vehicle 1 and a gear position signal from a gear position sensor 8 of the same are provided.

With the above arrangement, each of the transmitters 2 receives a noise generated by a noise source located in the vehicle 1 through the noise receiver 22 thereof and determines whether the wheel to which the transmitter 2 is installed is a front-wheel or a rear-wheel of the vehicle 1 based on the received noise.

Then, each of the transmitters 2 stores in a frame a location signal representative of the determination results, an acceleration signal generated by the G sensor 25, and signals representative of the sensing results from the sensing unit 21 and sends out the frame toward the receiver 3 at predetermined intervals, for example, of 1 minute.

The receiver 3 receives frames sent out from the transmitters 2 through at least one antenna 31.

Then, the receiver 3 analyzes each of the location signals contained in those frames and identifies whether a corresponding one of the four wheels (i.e., the wheel to which the transmitter 2 having sent out the frame is installed) is a front-wheel or a rear-wheel of the vehicle 1.

Further, the receiver 3 makes a determination for each of the transmitters 2 as to whether the wheel to which the transmitter 2 is installed is a right-wheel or a left-wheel of the vehicle 1 based on the acceleration signal contained in the frame sent out from the transmitter 2, the vehicle speed signal from the vehicle speed sensor 7, and the gear position signal from the gear position sensor 8.

Consequently, in the tire inflation pressure sensing apparatus S6, the receiver 3 can identify, for each of the transmitters 2, whether the transmitter 2 is installed to a front-right, a front-left, a rear-right, or a rear-left wheel of the vehicle 1 without using an ID signal specific to the transmitter 2.

Accordingly, all the transmitters 2 can be configured in the same way without having specific ID signals different from each other.

Moreover, the receiver 3 does not necessitate reference ID signals registered therein, thus saving the time-consuming task and additional devices required for the registration of reference ID signals in the receiver 3.

Seventh Embodiment

In this embodiment, a tire inflation pressure sensing apparatus S7 is provided which is configured to determine, for each of the transmitters 2, whether the transmitter 2 is installed to a front-wheel or a rear-wheel of the vehicle 1 as well as whether that is installed to a right-wheel or a left-wheel of the same using a noise generated by a noise source located in the vehicle 1.

Figure 11:
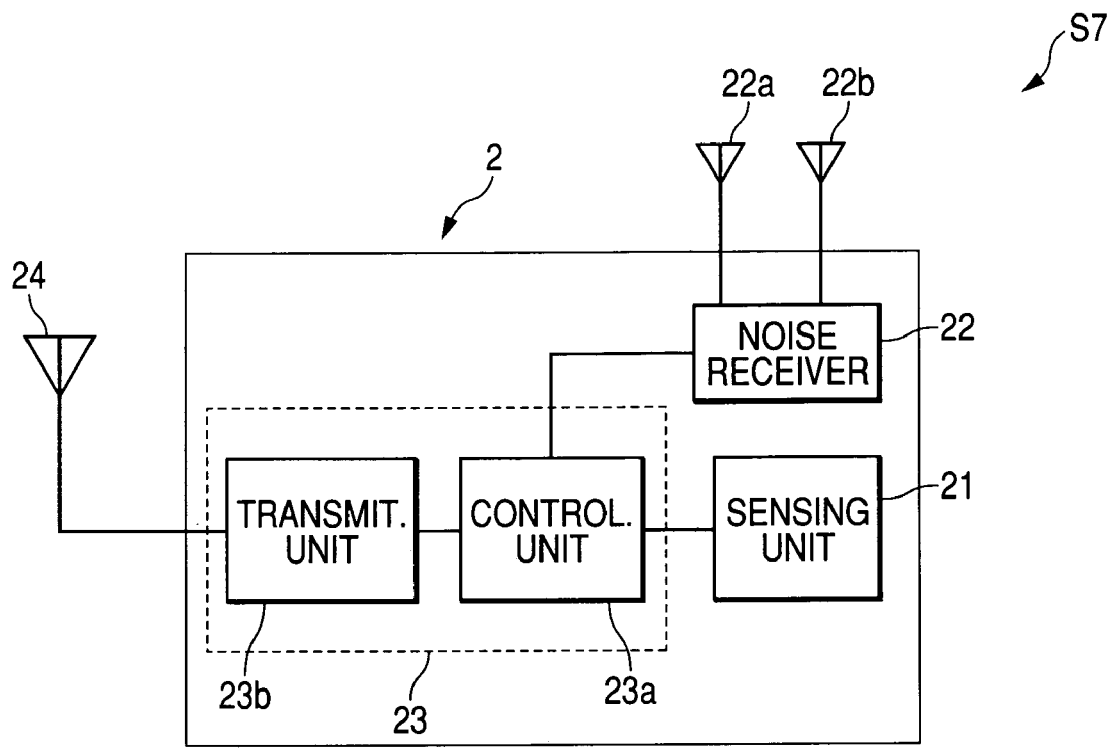
FIG. 11 is a block diagram showing the overall configuration of a transmitter of a tire inflation pressure sensing apparatus according to the seventh embodiment of the invention.

FIG. 11 shows the overall configuration of each of the transmitters 2 of the tire inflation pressure sensing apparatus S7, where a first antenna 22a and a second antenna 22b are provided through both of which the noise receiver 22 receives a noise generated by a noise source located in the vehicle 1.

Figure 12:
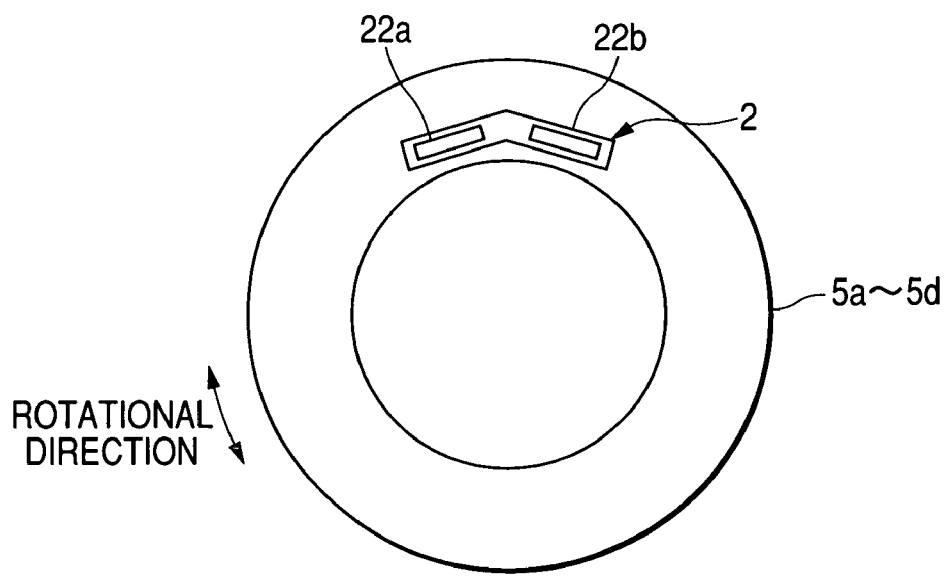
FIG. 12 is a schematic view illustrating an arrangement of a first and a second antenna of a noise receiver of a transmitter of the tire inflation pressure sensing apparatus according to the seventh embodiment of the invention on a wheel of a vehicle.

The first and second antennas 22a and 22b are arranged, referring to FIG. 12, at different angular positions on a corresponding one of the wheels.

Figure 13:
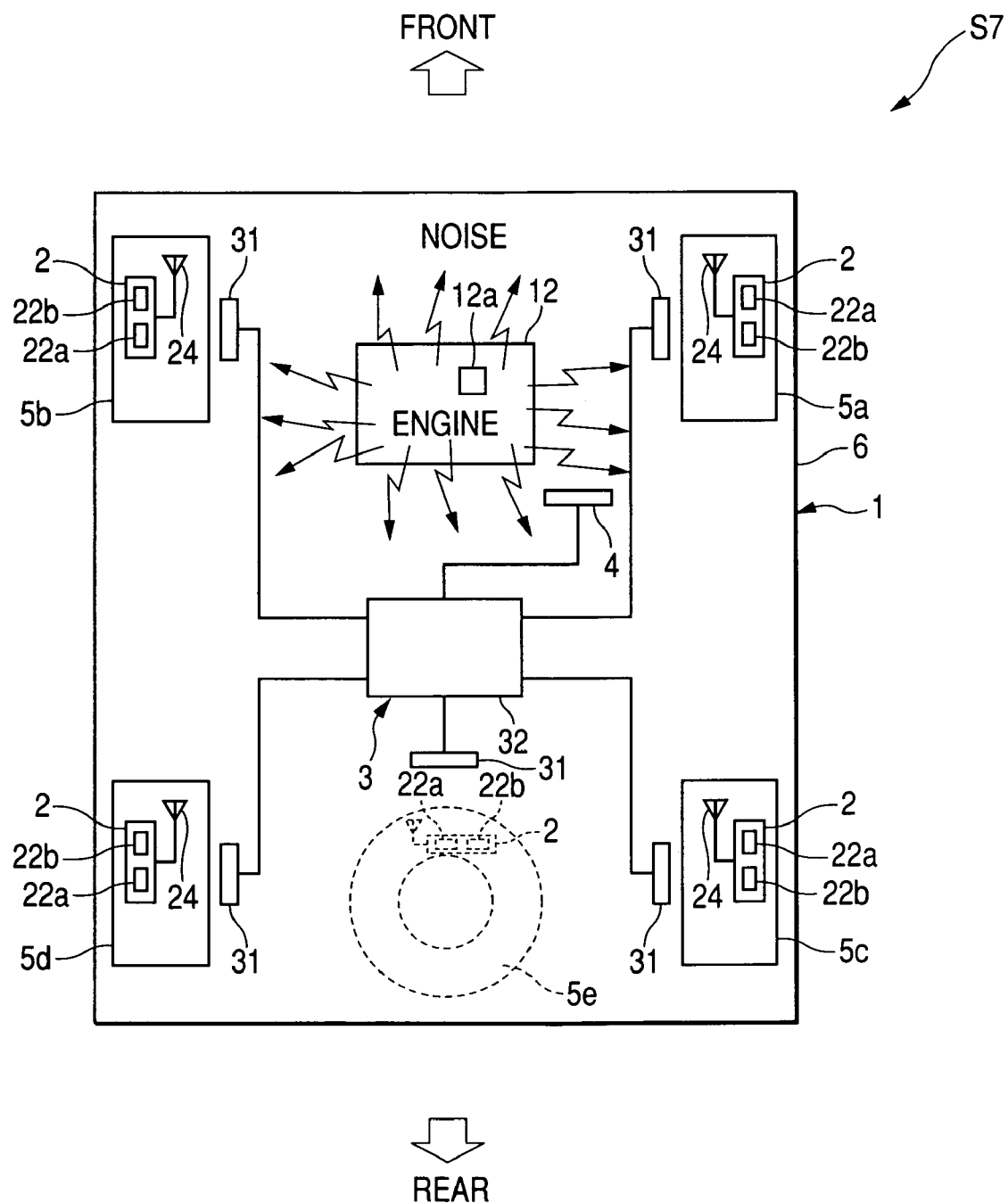
FIG. 13 is a schematic view illustrating an arrangement of the tire inflation pressure sensing apparatus according to the seventh embodiment of the invention on a vehicle.

With such an arrangement, referring now to FIG. 13, when the vehicle 1 runs forward, the first antenna 22a on a right-wheel 5a or 5c precedes the second antenna 22b on the same, while the second antenna 22b on a left-wheel 5b or 5c precedes the first antenna 22a on the same.

The noise receiver 22 of each of the transmitters 2 receives a noise generated by an engine ECU 12a of the vehicle 1 through both the first and second antennas 22a and 22b and provides a first and a second received noises to the controlling unit 23a of the transmitter 2.

Figure 14:
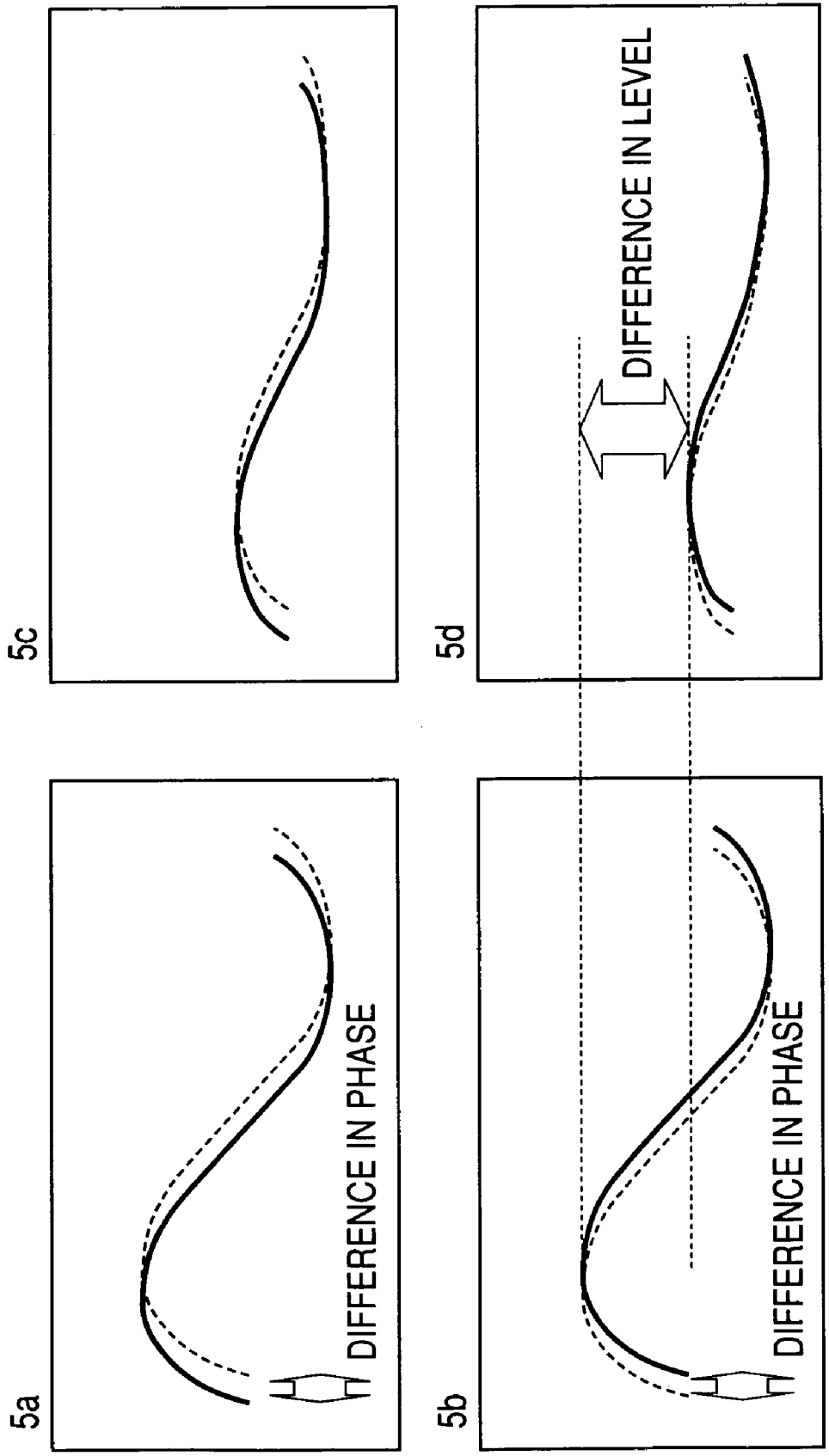
FIG. 14 is a view illustrating a difference in phase between a first and a second received noise received by a noise receiver of each of the transmitters of the tire inflation pressure sensing apparatus according to the seventh embodiment of the invention through a first and a second antenna of the noise receiver.

FIG. 14 shows the first and second received noises received by the noise receiver 22 of each of the transmitters 2 installed to wheels 5a-5d of the vehicle 1 when the vehicle 1 runs forward. In the figure, the first received noise is designated with a solid line, while the second received noise is designated with a dashed line.

As shown in FIG. 14, for each of the wheels 5a-5d, there is a difference in phase between the first and second received noises. This is due to the difference in angular position on the wheel between the first and second antennas 22a and 22b.

Specifically, for the right-wheels 5a and 5c, the first received noise precedes the second received noise. On the contrary, for the left-wheels 5b and 5d, the second received noise precedes the first received noise.

Moreover, since the distance from the engine ECU 12 to a front wheel 5a or 5b is shorter than that to a rear wheel 5c or 5d, the level of the first and second received noises received by the noise receiver 22 of the front wheel 5a or 5b is higher than that received by the noise receiver 22 of the rear wheel 5c or 5d.

Accordingly, the receiver 3 of the tire inflation pressure sensing apparatus S7 is configured to make, for each of the transmitters 2, a first determination as to whether the transmitter 2 is installed to a right-wheel or a left-wheel of the vehicle 1 based on the difference in phase between the first and second received noises and a second determination as to whether the transmitter 2 is installed to a front-wheel or a rear-wheel of the vehicle 1 based on the level of the first and second received noises.

Consequently, it becomes possible to identify, for each of the transmitters 2, whether the transmitter 2 is installed to a front-right, a front-left, a rear-right, or a rear-left wheel of the vehicle 1 without using an ID signal specific to the transmitter 2.

Moreover, for each of the transmitters 2, the difference in phase between the first and second received noises received when the vehicle 1 runs backward is in inverse relation to that received when the same runs forward. Accordingly, it is preferable for the receiver 3 of the tire inflation pressure sensing apparatus S7 to be provided with a gear position signal generated by the gear positions sensor 8 of the vehicle 1 as in the case of the tire inflation pressure sensing apparatus S3 of the third embodiment, so that the receive 3 can further make a determination as to whether the vehicle 1 runs forward or backward.

Furthermore, in the tire inflation pressure sensing apparatus S7, each of the transmitters 2 may be configured to determine, instead of the receiver 3, whether the wheel to which the transmitter 2 is installed is a front-right, a front-left, a rear-right, or a rear-left wheel of the vehicle 1 and send out a frame containing a location signal representative of the determination results. On the other hand, the receiver 3 may be configured to identify each of the transmitters 2 through analyzing a corresponding one of the location signals contained in the frames sent out from the transmitters 2.

In addition, since a spare wheel 5e of the vehicle 1 does not rotate with running of the vehicle 1, the level of the first and second received noises received by the noise receiver 22 of the transmitter 2 on the spare wheel 5e does not fluctuate so much. Thus, it is possible to identify the transmitter 2 on the spare wheel 5e based on the level of the first and second received noises.

Eighth Embodiment

This embodiment illustrates a method of determining whether a signal received by the receiver 3 of a tire inflation pressure sensing apparatus provided in the vehicle 1 has been sent out from one of the transmitters 2 of the tire inflation pressure sensing apparatus or a transmitter that is provided on a wheel of other vehicles. The tire inflation pressure sensing apparatus may be any of the tire inflation pressure sensing apparatuses S1-S7 according to the previous embodiments.

Figure 15:
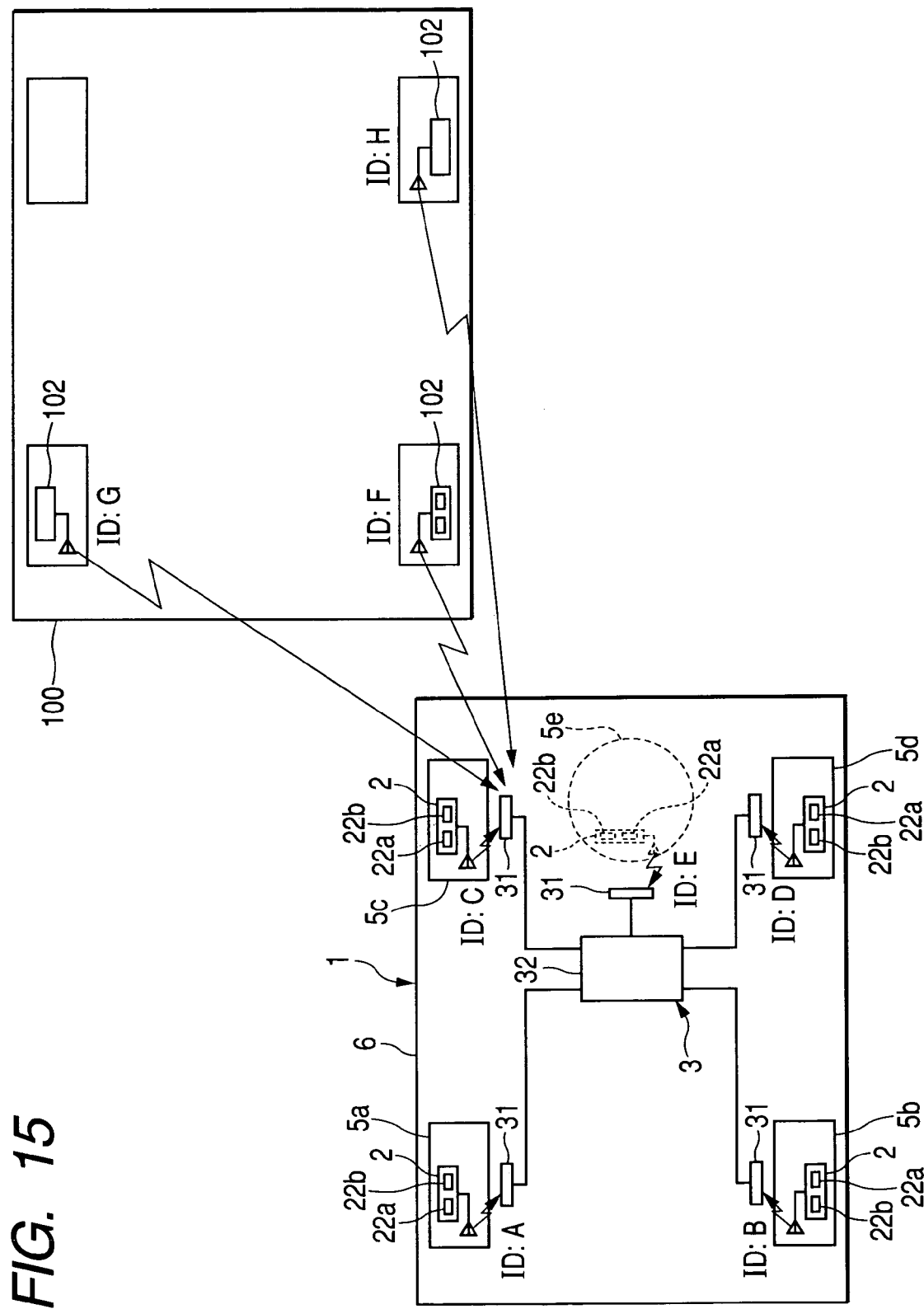
FIG. 15 is a schematic view illustrating a vehicle with another vehicle running close thereto in connection with the eighth embodiment of the invention.

FIG. 15 shows the vehicle 1 and a vehicle 100 running close to the vehicle 1. As shown in the figure, the receiver 3 provided on the body 6 of the vehicle 1 may receive frames sent out from transmitters 102 provided on wheels of the vehicle 100 in addition to frames sent out from the transmitters 2 provided on the wheels 5a-5e of the vehicle 1.

According to the method of the present embodiment, each transmitter is configured to store an ID signal representative of the identity thereof in every frame to be sent out therefrom. For example, the transmitters 2 provided on the wheels 5a-5e of the vehicle 1 have IDs A, B, C, D, and E respectively, while the three transmitters 102 provided on the vehicle 100 have IDs F, G, and H respectively.

On the other hand, the receiver 3 is configured to accumulate the number of times that it receives an ID signal. For example, FIG. 16 shows the accumulated numbers of times that the receiver 3 receives ID signals respectively representative of the different IDs A-H of the transmitters 2 and transmitters 102.

It can be seen from FIG. 16 that though the receiver 3 receives frames sent out from the transmitters 102 on the vehicle 100 as well, the accumulated numbers of times that the receiver 3 receives ID signals representative of the IDs F-H of the transmitters 102 are considerably less than those that receiver 3 receives ID signals representative of the IDs A-E of the transmitters 2 on the vehicle 1.

Accordingly, the receiver 3 is configured to determine whether a frame that contains an ID signal has been sent out from one of the transmitters 2 provided on the vehicle 1 or from one of the transmitters 102 provided on the vehicle 100 based on the accumulated number of times that it receives the ID signal.

Consequently, according to the method of the present embodiment, the receiver 3 does not necessitate reference ID signals registered therein, thus saving the time-consuming task and additional devices required for the registration of reference ID signals in the receiver 3.

Other Embodiments

While the above particular embodiments of the invention have been shown and described, it will be understood by those who practice the invention and those skilled in the art that various modifications, changes, and improvements may be made to the invention without departing from the spirit of the disclosed concept.

For example, in the sixth embodiment of the invention, the tire inflation pressure sensing apparatus S6 is achieved through combining the features of the tire inflation pressure sensing apparatuses S1 and S3 according to the first and third embodiments of the invention.

However, other tire inflation pressure sensing apparatuses may also be achieved through combining, in any possible way, the feature of one of the tire inflation pressure sensing apparatuses S1 and S2 according to the first and second embodiments of the invention and that of one of the tire inflation pressure sensing apparatuses S3-S5 according to the third to fifth embodiments of the invention. For example, in the case of combining the features of the tire inflation pressure sensing apparatuses S1 and S4, each transmitter 2 of the newly achieved tire inflation pressure sensing apparatus will work to determine whether the transmitter 2 is installed to a right-wheel or a left-wheel of the vehicle 1 as well as whether that is installed to a front-wheel or a rear-wheel of the same.

In the tire inflation pressure sensing apparatus S1 according to the first embodiment, each of the transmitters 2 is configured to make a determination only as to whether the transmitter 2 is installed to a front-wheel or a rear-wheel of the vehicle 1 based on a level of the noise received by the noise receiver 22 thereof.

However, when the wheels 5a-5d of the vehicle 1 are at different distances from the noise source, each of the transmitters 2 of the tire inflation pressure sensing apparatus S1 may be configured to determine whether the transmitter 2 is installed to a right-wheel or a left-wheel of the vehicle 1 as well as whether that is installed to a front-wheel or a rear-wheel of the same based on the level of the noise received by the noise receiver 22 thereof. This is because all the levels of the noises received by the noise receivers 22 of the transmitters 2 are different from each other due to different distances from the noise source to those noise receivers 22.

In the previous embodiments, a noise generated by a noise source such as the engine ECU 12a is utilized for determination of the location of the transmitters 2.

However, instead of a noise source, a specially designed signal source may be installed in the vehicle 1 to provide a signal for the determination of the location of the transmitters 2.

In the previous embodiments, the noise receivers 22 of the transmitters 2 may receive additional noises from noise sources other than a predefined noise source such as the engine ECU 12a. Accordingly, it is preferable for each of the transmitters 2 to be configured to extract only a noise having a frequency within a frequency band, for example a LF band containing 100 kHz, of the noise generated by the predefined noise source. The extraction task can be accomplished by providing a band-path filter in each of the transmitters 2.

In the previous embodiments, the receiver 3 includes four antennas 31 each of which corresponds to one of the four transmitters 2 provided on different wheels of the vehicle 1.

However, the receiver 3 may also be configured to include only a single antenna 31, through which the receiver 3 receives all the frames sent out from the four transmitters 2 provided on different wheels of the vehicle 1.

In the seventh embodiment, each of the transmitters 2 is provided with two antennas 22a and 22b for receiving a noise from the noise source.

However, each of the transmitters 2 may also be provided with more than two antennas for receiving a noise from the noise source, which are arranged at different angular positions on a corresponding wheel of the vehicle 1.

Further, it is preferable for those antennas to be arranged on the corresponding wheel of the vehicle 1 such that all the antennas have the same axial position on the wheel. As a result, all the received noises received respectively through those antennas have the same level, but different phases.

In the eighth embodiment, each of the transmitters 2 has a specific ID signal representative of the identity thereof. In other words, ID signals of different transmitters 2 are different from each other.

However, all the transmitters 2 may have the same ID signal that is representative of the identity of the vehicle 1 other than those of individual wheels. In this case, the receiver 3 is still able to determine whether a frame received thereby has been sent out from one of the transmitters 2 or from a transmitter provided on other vehicle wheels. As a consequence, the receiver 3 still does not necessitate reference ID signals registered therein, thus saving the time-consuming task and additional devices required for the registration of reference ID signals in the receiver 3.

Such modifications, changes, and improvements within the skill of the art are intended to be covered by the appended claims.

What is claimed is:

1. A tire inflation pressure sensing apparatus comprising:
a plurality of pressure sensors each of which is provided on one of a plurality of wheels of a vehicle, each of said pressure sensors working to sense an inflation pressure of a tire mounted on a corresponding one of the wheels and output a pressure signal representative of the sensed inflation pressure of the tire;
a plurality of transmitters each of which is provided on one of the plurality of wheels of the vehicle, each of said transmitters being configured to receive the pressure signal outputted from a corresponding one of said pressure sensors and send out a pressure transmitting signal corresponding to the received pressure signal;
a first receiver provided on a body of the vehicle, said first receiver being configured to receive the pressure transmitting signals sent out from said transmitters and determine the inflation pressures of the tires based on the respective received pressure transmitting signals;
a plurality of second receivers each of which is provided on one of the plurality of wheels of the vehicle, each of said second receivers working to receive a signal generated by a signal source that is located in the vehicle and provide the received signal to a corresponding one of said transmitters; and
a plurality of acceleration sensors each of which is provided on one of the plurality of wheels of the vehicle, each of said acceleration sensors working to generate an acceleration signal as a function of a circumferential acceleration of a corresponding one of the wheels and output the acceleration signal to a corresponding one of said transmitters,
wherein each of said transmitters works to make a first determination for a corresponding one of the wheels of the vehicle as to whether the wheel is a front-wheel or a rear-wheel of the vehicle based on a level of the signal provided by a corresponding one of said second receivers and make a second determination for the same as to whether the wheel is a right-wheel or a left-wheel of the vehicle based on the acceleration signal outputted from a corresponding one of said acceleration sensors.

2. The tire inflation pressure sensing apparatus as set forth in claim 1, wherein the signal source is a noise source that generates a noise as the signal.

3. The tire inflation pressure sensing apparatus as set forth in claim 2, wherein the noise generated by the noise source has a frequency within one of a voice band, a LF band, a HF band, a VHF band, and a UHF band.

4. The tire inflation pressure sensing apparatus as set forth in claim 1, wherein the signal source is a specially designed one to generate the signal only for the tire inflation pressure sensing apparatus.

5. The tire inflation pressure sensing apparatus as set forth in claim 1, wherein the signal source is designed to generate the signal for performing a predefined operation of the vehicle.

6. The tire inflation pressure sensing apparatus as set forth in claim 1, wherein each of said transmitters is configured to send out at predetermined time intervals an ID signal representative of an identity thereof together with the pressure transmitting signal, and wherein said first receiver is configured to accumulate the number of times that said first receiver receives an ID signal and determine whether a pressure transmitting signal accompanying the ID signal has been sent out from one of said transmitters provided in the vehicle or from a transmitter provided in other vehicles based on the accumulated number of times that said first receiver receives the ID signal.

7. A tire inflation pressure sensing apparatus comprising:
a plurality of pressure sensors each of which is provided on one of a plurality of wheels of a vehicle, each of said pressure sensors working to sense an inflation pressure of a tire mounted on a corresponding one of the wheels and output a pressure signal representative of the sensed inflation pressure of the tire;
a plurality of transmitters each of which is provided on one of the plurality of wheels of the vehicle, each of said transmitters being configured to receive the pressure signal outputted from a corresponding one of said pressure sensors and send out a pressure transmitting signal corresponding to the received pressure signal;
a first receiver provided on a body of the vehicle, said first receiver being configured to receive the pressure transmitting signals sent out from said transmitters and determine the inflation pressures of the tires based on the respective received pressure transmitting signals;
a plurality of second receivers each of which is provided on one of the plurality of wheels of the vehicle, each of said second receivers working to receive a signal generated by a signal source that is located in the vehicle and provide the received signal to a corresponding one of said transmitters; and
a plurality of acceleration sensors each of which is provided on one of the plurality of wheels of the vehicle, each of said acceleration sensors working to generate an acceleration signal as a function of a circumferential acceleration of a corresponding one of the wheels and output the acceleration signal to a corresponding one of said transmitters,
wherein each of said transmitters works to make a first determination for a corresponding one of the wheels of the vehicle as to whether the wheel is a front-wheel or a rear-wheel of the vehicle based on a level of the signal provided by a corresponding one of said second receivers, and
wherein each of said transmitters works to relay the acceleration signal outputted from a corresponding one of said acceleration sensors to said first receiver, and said first receiver works to make a second determination for each of the wheels as to whether the wheel is a right-wheel or a left-wheel of the vehicle based on the acceleration signal relayed from a corresponding one of said transmitters.

8. The tire inflation pressure sensing apparatus as set forth in claim 7, wherein the signal source is a noise source that generates a noise as the signal.

9. The tire inflation pressure sensing apparatus as set forth in claim 8, wherein the noise generated by the noise source has a frequency within one of a voice band, a LF band, a HF band, a VHF band, and a UHF band.

10. The tire inflation pressure sensing apparatus as set forth in claim 7, wherein the signal source is a specially designed one to generate the signal only for the tire inflation pressure sensing apparatus.

11. The tire inflation pressure sensing apparatus as set forth in claim 7, wherein the signal source is designed to generate the signal for performing a predefined operation of the vehicle.

12. The tire inflation pressure sensing apparatus as set forth in claim 7, wherein each of said transmitters is configured to send out at predetermined time intervals an ID signal representative of an identity thereof together with the pressure transmitting signal, and wherein said first receiver is configured to accumulate the number of times that said first receiver receives an ID signal and determine whether a pressure transmitting signal accompanying the ID signal has been sent out from one of said transmitters provided in the vehicle or from a transmitter provided in other vehicles based on the accumulated number of times that said first receiver receives the ID signal.

13. A tire inflation pressure sensing apparatus comprising:
a plurality of pressure sensors each of which is provided on one of a plurality of wheels of a vehicle, each of said pressure sensors working to sense an inflation pressure of a tire mounted on a corresponding one of the wheels and output a pressure signal representative of the sensed inflation pressure of the tire;
a plurality of transmitters each of which is provided on one of the plurality of wheels of the vehicle, each of said transmitters being configured to receive the pressure signal outputted from a corresponding one of said pressure sensors and send out a pressure transmitting signal corresponding to the received pressure signal;
a first receiver provided on a body of the vehicle, said first receiver being configured to receive the pressure transmitting signals sent out from said transmitters and determine the inflation pressures of the tires based on the respective received pressure transmitting signals;
a plurality of second receivers each of which is provided on one of the plurality of wheels of the vehicle, each of said second receivers working to receive a signal generated by a signal source that is located in the vehicle and provide the received signal to a corresponding one of said transmitters;
a plurality of first acceleration sensors each of which is provided on one of the plurality of wheels of the vehicle, each of said first acceleration sensors working to generate a first acceleration signal as a function of a component of gravitational acceleration in a sensing direction thereof and output the first acceleration signal to a corresponding one of said transmitters; and
a plurality of second acceleration sensors each of which is provided on one of the plurality of wheels of the vehicle such that a sensing direction thereof is different from that of a corresponding one of said first acceleration sensors, each of said second acceleration sensors working to generate a second acceleration signal as a function of a component of gravitational acceleration in the sensing direction thereof and output the second acceleration signal to a corresponding one of said transmitters,
wherein each of said transmitters works to make a first determination for a corresponding one of the wheels of the vehicle as to whether the wheel is a front-wheel or a rear-wheel of the vehicle based on a level of the signal provided by a corresponding one of said second receivers and make a second determination for the same as to whether the wheel is a right-wheel or a left-wheel of the vehicle based on a difference in phase between the first and second acceleration signals outputted from a corresponding one of said first acceleration sensors and that of said second acceleration sensors.

14. The tire inflation pressure sensing apparatus as set forth in claim 13, wherein the signal source is a noise source that generates a noise as the signal.

15. The tire inflation pressure sensing apparatus as set forth in claim 14, wherein the noise generated by the noise source has a frequency within one of a voice band, a LF band, a HF band, a VHF band, and a UHF band.

16. The tire inflation pressure sensing apparatus as set forth in claim 13, wherein the signal source is a specially designed one to generate the signal only for the tire inflation pressure sensing apparatus.

17. The tire inflation pressure sensing apparatus as set forth in claim 13, wherein the signal source is designed to generate the signal for performing a predefined operation of the vehicle.

18. The tire inflation pressure sensing apparatus as set forth in claim 13, wherein each of said transmitters is configured to send out at predetermined time intervals an ID signal representative of an identity thereof together with the pressure transmitting signal, and wherein said first receiver is configured to accumulate the number of times that said first receiver receives an ID signal and determine whether a pressure transmitting signal accompanying the ID signal has been sent out from one of said transmitters provided in the vehicle or from a transmitter provided in other vehicles based on the accumulated number of times that said first receiver receives the ID signal.

19. A tire inflation pressure sensing apparatus comprising:
a plurality of pressure sensors each of which is provided on one of a plurality of wheels of a vehicle, each of said pressure sensors working to sense an inflation pressure of a tire mounted on a corresponding one of the wheels and output a pressure signal representative of the sensed inflation pressure of the tire;
a plurality of transmitters each of which is provided on one of the plurality of wheels of the vehicle, each of said transmitters being configured to receive the pressure signal outputted from a corresponding one of said pressure sensors and send out a pressure transmitting signal corresponding to the received pressure signal;
a first receiver provided on a body of the vehicle, said first receiver being configured to receive the pressure transmitting signals sent out from said transmitters and determine the inflation pressures of the tires based on the respective received pressure transmitting signals;
a plurality of second receivers each of which is provided on one of the plurality of wheels of the vehicle, each of said second receivers working to receive a signal generated by a signal source that is located in the vehicle and provide the received signal to a corresponding one of said transmitters;
a plurality of first acceleration sensors each of which is provided on one of the plurality of wheels of the vehicle, each of said first acceleration sensors working to generate a first acceleration signal as a function of a component of gravitational acceleration in a sensing direction thereof and output the first acceleration signal to a corresponding one of said transmitters; and
a plurality of second acceleration sensors each of which is provided on one of the plurality of wheels of the vehicle such that a sensing direction thereof is different from that of a corresponding one of said first acceleration sensors, each of said second acceleration sensors working to generate a second acceleration signal as a function of a component of gravitational acceleration in the sensing direction thereof and output the second acceleration signal to a corresponding one of said transmitters, wherein each of said transmitters works to make a first determination for a corresponding one of the wheels of the vehicle as to whether the wheel is a front-wheel or a rear-wheel of the vehicle based on a level of the signal provided by a corresponding one of said second receivers, and wherein each of said transmitters works to relay the first and second acceleration signals outputted from a corresponding one of said first acceleration sensors and that of said second acceleration sensors to said first receiver, and said first receiver works to make a second determination for each of the wheels as to whether the wheel is a right-wheel or a left-wheel of the vehicle based on a difference in phase between the first and second acceleration signals relayed from a corresponding one of said transmitters.

20. The tire inflation pressure sensing apparatus as set forth in claim 19, wherein the signal source is a noise source that generates a noise as the signal.

21. The tire inflation pressure sensing apparatus as set forth in claim 20, wherein the noise generated by the noise source has a frequency within one of a voice band, a LF band, a HF band, a VHF band, and a UHF band.

22. The tire inflation pressure sensing apparatus as set forth in claim 19, wherein the signal source is a specially designed one to generate the signal only for the tire inflation pressure sensing apparatus.

23. The tire inflation pressure sensing apparatus as set forth in claim 19, wherein the signal source is designed to generate the signal for performing a predefined operation of the vehicle.

24. The tire inflation pressure sensing apparatus as set forth in claim 19, wherein each of said transmitters is configured to send out at predetermined time intervals an ID signal representative of an identity thereof together with the pressure transmitting signal, and wherein said first receiver is configured to accumulate the number of times that said first receiver receives an ID signal and determine whether a pressure transmitting signal accompanying the ID signal has been sent out from one of said transmitters provided in the vehicle or from a transmitter provided in other vehicles based on the accumulated number of times that said first receiver receives the ID signal.

25. A tire inflation pressure sensing apparatus comprising:
a plurality of pressure sensors each of which is provided on one of a plurality of wheels of a vehicle, each of said pressure sensors working to sense an inflation pressure of a tire mounted on a corresponding one of the wheels and output a pressure signal representative of the sensed inflation pressure of the tire;
a plurality of transmitters each of which is provided on one of the plurality of wheels of the vehicle, each of said transmitters being configured to receive the pressure signal outputted from a corresponding one of said pressure sensors and send out a pressure transmitting signal corresponding to the received pressure signal;
a first receiver provided on a body of the vehicle, said first receiver being configured to receive the pressure transmitting signals sent out from said transmitters and determine the inflation pressures of the tires based on the respective received pressure transmitting signals;
a plurality of second receivers each of which is provided on one of the plurality of wheels of the vehicle, each of said second receivers working to receive a signal generated by a signal source that is located in the vehicle and provide the received signal to a corresponding one of said transmitters; and a plurality of acceleration sensors each of which is provided on one of the plurality of wheels of the vehicle, each of said acceleration sensors working to generate an acceleration signal as a function of a circumferential acceleration of a corresponding one of the wheels and output the acceleration signal to a corresponding one of said transmitters, wherein each of said transmitters works to relay the signal provided by a corresponding one of said second receivers to said first receiver, and said first receiver works to make a first determination for each of the wheels of the vehicle as to whether the wheel is a front-wheel or a rear-wheel of the vehicle based on a level of the signal relayed from a corresponding one of said transmitters, and wherein each of said transmitters works to make a second determination for a corresponding one of the wheels as to whether the wheel is a right-wheel or a left-wheel of the vehicle based on the acceleration signal outputted from a corresponding one of said acceleration sensors.

26. The tire inflation pressure sensing apparatus as set forth in claim 25, wherein the signal source is a noise source that generates a noise as the signal.

27. The tire inflation pressure sensing apparatus as set forth in claim 26, wherein the noise generated by the noise source has a frequency within one of a voice band, a LF band, a HF band, a VHF band, and a UHF band.

28. The tire inflation pressure sensing apparatus as set forth in claim 25, wherein the signal source is a specially designed one to generate the signal only for the tire inflation pressure sensing apparatus.

29. The tire inflation pressure sensing apparatus as set forth in claim 25, wherein the signal source is designed to generate the signal for performing a predefined operation of the vehicle.

30. The tire inflation pressure sensing apparatus as set forth in claim 25, wherein each of said transmitters is configured to send out at predetermined time intervals an ID signal representative of an identity thereof together with the pressure transmitting signal, and wherein said first receiver is configured to accumulate the number of times that said first receiver receives an ID signal and determine whether a pressure transmitting signal accompanying the ID signal has been sent out from one of said transmitters provided in the vehicle or from a transmitter provided in other vehicles based on the accumulated number of times that said first receiver receives the ID signal.

31. A tire inflation pressure sensing apparatus comprising:
a plurality of pressure sensors each of which is provided on one of a plurality of wheels of a vehicle, each of said pressure sensors working to sense an inflation pressure of a tire mounted on a corresponding one of the wheels and output a pressure signal representative of the sensed inflation pressure of the tire;
a plurality of transmitters each of which is provided on one of the plurality of wheels of the vehicle, each of said transmitters being configured to receive the pressure signal outputted from a corresponding one of said pressure sensors and send out a pressure transmitting signal corresponding to the received pressure signal;
a first receiver provided on a body of the vehicle, said first receiver being configured to receive the pressure transmitting signals sent out from said transmitters and determine the inflation pressures of the tires based on the respective received pressure transmitting signals;
a plurality of second receivers each of which is provided on one of the plurality of wheels of the vehicle, each of said second receivers working to receive a signal generated by a signal source that is located in the vehicle and provide the received signal to a corresponding one of said transmitters; and a plurality of acceleration sensors each of which is provided on one of the plurality of wheels of the vehicle, each of said acceleration sensors working to generate an acceleration signal as a function of a circumferential acceleration of a corresponding one of the wheels and output the acceleration signal to a corresponding one of said transmitters, wherein each of said transmitters works to relay the signal provided by a corresponding one of said second receivers and the acceleration signal outputted from a corresponding one of said acceleration sensors to said first receiver, and wherein said first receiver works to make, for each of the wheels of the vehicle, a first determination as to whether the wheel is a front-wheel or a rear-wheel of the vehicle based on a level of the signal relayed from a corresponding one of said transmitters and a second determination as to whether the wheel is a right-wheel or a left-wheel of the vehicle based on the acceleration signal relayed from the same.

32. The tire inflation pressure sensing apparatus as set forth in claim 31, wherein the signal source is a noise source that generates a noise as the signal.

33. The tire inflation pressure sensing apparatus as set forth in claim 32, wherein the noise generated by the noise source has a frequency within one of a voice band, a LF band, a HF band, a VHF band, and a UHF band.

34. The tire inflation pressure sensing apparatus as set forth in claim 31, wherein the signal source is a specially designed one to generate the signal only for the tire inflation pressure sensing apparatus.

35. The tire inflation pressure sensing apparatus as set forth in claim 31, wherein the signal source is designed to generate the signal for performing a predefined operation of the vehicle.

36. The tire inflation pressure sensing apparatus as set forth in claim 31, wherein each of said transmitters is configured to send out at predetermined time intervals an ID signal representative of an identity thereof together with the pressure transmitting signal, and wherein said first receiver is configured to accumulate the number of times that said first receiver receives an ID signal and determine whether a pressure transmitting signal accompanying the ID signal has been sent out from one of said transmitters provided in the vehicle or from a transmitter provided in other vehicles based on the accumulated number of times that said first receiver receives the ID signal.

37. A tire inflation pressure sensing apparatus comprising:

a plurality of pressure sensors each of which is provided on one of a plurality of wheels of a vehicle, each of said pressure sensors working to sense an inflation pressure of a tire mounted on a corresponding one of the wheels and output a pressure signal representative of the sensed inflation pressure of the tire;

a plurality of transmitters each of which is provided on one of the plurality of wheels of the vehicle, each of said transmitters being configured to receive the pressure signal outputted from a corresponding one of said pressure sensors and send out a pressure transmitting signal corresponding to the received pressure signal;

a first receiver provided on a body of the vehicle, said first receiver being configured to receive the pressure transmitting signals sent out from said transmitters and determine the inflation pressures of the tires based on the respective received pressure transmitting signals;

a plurality of second receivers each of which is provided on one of the plurality of wheels of the vehicle, each of said second receivers working to receive a signal generated by a signal source that is located in the vehicle and provide the received signal to a corresponding one of said transmitters;

a plurality of first acceleration sensors each of which is provided on one of the plurality of wheels of the vehicle, each of said first acceleration sensors working to generate a first acceleration signal as a function of a component of gravitational acceleration in a sensing direction thereof and output the first acceleration signal to a corresponding one of said transmitters; and a plurality of second acceleration sensors each of which is provided on one of the plurality of wheels of the vehicle such that a sensing direction thereof is different from that of a corresponding one of said first acceleration sensors, each of said second acceleration sensors working to generate a second acceleration signal as a function of a component of gravitational acceleration in the sensing direction thereof and output the second acceleration signal to a corresponding one of said transmitters, wherein each of said transmitters works to relay the signal provided by a corresponding one of said second receivers to said first receiver, and said first receiver works to make a first determination for each of the wheels of the vehicle as to whether the wheel is a front-wheel or a rear-wheel of the vehicle based on a level of the signal relayed from a corresponding one of said transmitters, and wherein each of said transmitters works to make a second determination for a corresponding one of the wheels as to whether the wheel is a right-wheel or a left-wheel of the vehicle based on a difference in phase between the first and second acceleration signals outputted from a corresponding one of said first acceleration sensors and that of said second acceleration sensors.

38. The tire inflation pressure sensing apparatus as set forth in claim 37, wherein the signal source is a noise source that generates a noise as the signal.

39. The tire inflation pressure sensing apparatus as set forth in claim 38, wherein the noise generated by the noise source has a frequency within one of a voice band, a LF band, a HF band, a VHF band, and a UHF band.

40. The tire inflation pressure sensing apparatus as set forth in claim 37, wherein the signal source is a specially designed one to generate the signal only for the tire inflation pressure sensing apparatus.

41. The tire inflation pressure sensing apparatus as set forth in claim 37, wherein the signal source is designed to generate the signal for performing a predefined operation of the vehicle.

42. The tire inflation pressure sensing apparatus as set forth in claim 37, wherein each of said transmitters is configured to send out at predetermined time intervals an ID signal representative of an identity thereof together with the pressure transmitting signal, and wherein said first receiver is configured to accumulate the number of times that said first receiver receives an ID signal and determine whether a pressure transmitting signal accompanying the ID signal has been sent out from one of said transmitters provided in the vehicle or from a transmitter provided in other vehicles based on the accumulated number of times that said first receiver receives the ID signal.

43. A tire inflation pressure sensing apparatus comprising:
a plurality of pressure sensors each of which is provided on one of a plurality of wheels of a vehicle, each of said pressure sensors working to sense an inflation pressure of a tire mounted on a corresponding one of the wheels and output a pressure signal representative of the sensed inflation pressure of the tire;
a plurality of transmitters each of which is provided on one of the plurality of wheels of the vehicle, each of said transmitters being configured to receive the pressure signal outputted from a corresponding one of said pressure sensors and send out a pressure transmitting signal corresponding to the received pressure signal;
a first receiver provided on a body of the vehicle, said first receiver being configured to receive the pressure transmitting signals sent out from said transmitters and determine the inflation pressures of the tires based on the respective received pressure transmitting signals;
a plurality of second receivers each of which is provided on one of the plurality of wheels of the vehicle, each of said second receivers working to receive a signal generated by a signal source that is located in the vehicle and provide the received signal to a corresponding one of said transmitters;
a plurality of first acceleration sensors each of which is provided on one of the plurality of wheels of the vehicle, each of said first acceleration sensors working to generate a first acceleration signal as a function of a component of gravitational acceleration in a sensing direction thereof and output the first acceleration signal to a corresponding one of said transmitters; and
a plurality of second acceleration sensors each of which is provided on one of the plurality of wheels of the vehicle such that a sensing direction thereof is different from that of a corresponding one of said first acceleration sensors, each of said second acceleration sensors working to generate a second acceleration signal as a function of a component of gravitational acceleration in the sensing direction thereof and output the second acceleration signal to a corresponding one of said transmitters,
wherein each of said transmitters works to relay the signal provided by a corresponding one of said second receivers and the first and second acceleration signals outputted from that of said first acceleration sensors and that of said second acceleration sensors to said first receiver, and
wherein said first receiver works to make, for each of the wheels of the vehicle, a first determination as to whether the wheel is a front-wheel or a rear-wheel of the vehicle based on a level of the signal relayed from a corresponding one of said transmitters and a second determination as to whether the wheel is a right-wheel or a left-wheel of the vehicle based on a difference in phase between the first and second acceleration signals relayed from the same.

44. The tire inflation pressure sensing apparatus as set forth in claim 43, wherein the signal source is a noise source that generates a noise as the signal.

45. The tire inflation pressure sensing apparatus as set forth in claim 44, wherein the noise generated by the noise source has a frequency within one of a voice band, a LF band, a HF band, a VHF band, and a UHF band.

46. The tire inflation pressure sensing apparatus as set forth in claim 43, wherein the signal source is a specially designed one to generate the signal only for the tire inflation pressure sensing apparatus.

47. The tire inflation pressure sensing apparatus as set forth in claim 43, wherein the signal source is designed to generate the signal for performing a predefined operation of the vehicle.

48. The tire inflation pressure sensing apparatus as set forth in claim 43, wherein each of said transmitters is configured to send out at predetermined time intervals an ID signal representative of an identity thereof together with the pressure transmitting signal, and wherein said first receiver is configured to accumulate the number of times that said first receiver receives an ID signal and determine whether a pressure transmitting signal accompanying the ID signal has been sent out from one of said transmitters provided in the vehicle or from a transmitter provided in other vehicles based on the accumulated number of times that said first receiver receives the ID signal.

49. A tire inflation pressure sensing apparatus comprising:
a plurality of pressure sensors each of which is provided on one of a plurality of wheels of a vehicle, each of said pressure sensors working to sense an inflation pressure of a tire mounted on a corresponding one of the wheels and output a pressure signal representative of the sensed inflation pressure of the tire;
a plurality of transmitters each of which is provided on one of the plurality of wheels of the vehicle, each of said transmitters being configured to receive the pressure signal outputted from a corresponding one of said pressure sensors and send out a pressure transmitting signal corresponding to the received pressure signal;
a first receiver provided on a body of the vehicle, said first receiver being configured to receive the pressure transmitting signals sent out from said transmitters and determine the inflation pressures of the tires based on the respective received pressure transmitting signals; and
a plurality of second receivers each of which is provided on one of the plurality of wheels of the vehicle, each of said second receivers having a first and a second antenna that are provided at different angular positions on a corresponding one of the wheels, each of said second receivers working to receive a signal generated by a signal source that is located in the vehicle through both the first and second antennas thereof and provide a first and a second received signal to a corresponding one of said transmitters,
wherein each of said transmitters works to make a determination for a corresponding one of the wheels as to whether the wheel is a right-wheel or a left-wheel of the vehicle based on a difference in phase between the first and second received signals provided by a corresponding one of said second receivers.

50. The tire inflation pressure sensing apparatus as set forth in claim 49, wherein each of said transmitters works to further make a determination for the corresponding one of the wheels as to whether the wheel is a front-wheel or a rear-wheel of the vehicle based on a level of the first and second received signals provided by the corresponding one of said second receivers.

51. The tire inflation pressure sensing apparatus as set forth in claim 49, wherein the first and second antennas of each of said second receivers are provided on the corresponding one of the wheels of the vehicle such that a position of the first antenna in an axial direction of the wheel is coincident with that of the second antenna.

52. The tire inflation pressure sensing apparatus as set forth in claim 49, wherein the signal source is a noise source that generates a noise as the signal.

53. The tire inflation pressure sensing apparatus as set forth in claim 52, wherein the noise generated by the noise source has a frequency within one of a voice band, a LF band, a HF band, a VHF band, and a UHF band.

54. The tire inflation pressure sensing apparatus as set forth in claim 49, wherein the signal source is a specially designed one to generate the signal only for the tire inflation pressure sensing apparatus.

55. The tire inflation pressure sensing apparatus as set forth in claim 49, wherein the signal source is designed to generate the signal for performing a predefined operation of the vehicle.

56. The tire inflation pressure sensing apparatus as set forth in claim 49, wherein each of said transmitters is configured to send out at predetermined time intervals an ID signal representative of an identity thereof together with the pressure transmitting signal, and wherein said first-receiver is configured to accumulate the number of times that said first receiver receives an ID signal and determine whether a pressure transmitting signal accompanying the ID signal has been sent out from one of said transmitters provided in the vehicle or from a transmitter provided in other vehicles based on the accumulated number of times that said first receiver receives the ID signal.

57. A tire inflation pressure sensing apparatus comprising:
a plurality of pressure sensors each of which is provided on one of a plurality of wheels of a vehicle, each of said pressure sensors working to sense an inflation pressure of a tire mounted on a corresponding one of the wheels and output a pressure signal representative of the sensed inflation pressure of the tire;
a plurality of transmitters each of which is provided on one of the plurality of wheels of the vehicle, each of said transmitters being configured to receive the pressure signal outputted from a corresponding one of said pressure sensors and send out a pressure transmitting signal corresponding to the received pressure signal;
a first receiver provided on a body of the vehicle, said first receiver being configured to receive the pressure transmitting signals sent out from said transmitters and determine the inflation pressures of the tires based on the respective received pressure transmitting signals; and
a plurality of second receivers each of which is provided on one of the plurality of wheels of the vehicle, each of said second receivers having a first and a second antenna that are provided at different angular positions on a corresponding one of the wheels, each of said second receivers working to receive a signal generated by a signal source that is located in the vehicle through both the first and second antennas thereof and provide a first and a second received signal to a corresponding one of said transmitters,
wherein each of said transmitters works to relay the first and second received signals provided by a corresponding one of said second receivers to said first receiver, and
wherein said first receiver works to make a determination for each of the wheels of the vehicle as to whether the wheel is a right-wheel or a left-wheel of the vehicle based on a difference in phase between the first and second received signals relayed from a corresponding one of said transmitters.

58. The tire inflation pressure sensing apparatus as set forth in claim 57, wherein said first receiver works to further make a determination for each of the wheels of the vehicle as to whether the wheel is a front-wheel or a rear-wheel of the vehicle based on a level of the first and second received signals relayed from the corresponding one of said transmitters.

59. The tire inflation pressure sensing apparatus as set forth in claim 57, wherein the first and second antennas of each of said second receivers are provided on the corresponding one of the wheels of the vehicle such that a position of the first antenna in an axial direction of the wheel is coincident with that of the second antenna.

60. The tire inflation pressure sensing apparatus as set forth in claim 57, wherein the signal source is a noise source that generates a noise as the signal.

61. The tire inflation pressure sensing apparatus as set forth in claim 60, wherein the noise generated by the noise source has a frequency within one of a voice band, a LF band, a HF band, a VHF band, and a UHF band.

62. The tire inflation pressure sensing apparatus as set forth in claim 57, wherein the signal source is a specially designed one to generate the signal only for the tire inflation pressure sensing apparatus.

63. The tire inflation pressure sensing apparatus as set forth in claim 57, wherein the signal source is designed to generate the signal for performing a predefined operation of the vehicle.

64. The tire inflation pressure sensing apparatus as set forth in claim 57, wherein each of said transmitters is configured to send out at predetermined time intervals an ID signal representative of an identity thereof together with the pressure transmitting signal, and wherein said first receiver is configured to accumulate the number of times that said first receiver receives an ID signal and determine whether a pressure transmitting signal accompanying the ID signal has been sent out from one of said transmitters provided in the vehicle or from a transmitter provided in other vehicles based on the accumulated number of times that said first receiver receives the ID signal.

* * * * *